US012720022B2

(12) United States Patent
Kadotani et al.

(10) Patent No.: US 12,720,022 B2
(45) Date of Patent: Aug. 25, 2026

(54) PROJECTOR WITH THERMALLY MANAGED OPTICAL PATH SHIFTING MODULE AND THERMOELECTRIC PANEL COOLING

(71) Applicant: SEIKO EPSON CORPORATION, Tokyo (JP)

(72) Inventors: Norikazu Kadotani, Azumino (JP); Yuki Naito, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 263 days.

(21) Appl. No.: 18/515,763

(22) Filed: Nov. 21, 2023

(65) Prior Publication Data

US 2024/0168235 A1 May 23, 2024

(30) Foreign Application Priority Data

Nov. 22, 2022 (JP) ................................ 2022-186674

(51) Int. Cl.
*H04N 9/31* (2006.01)

(52) U.S. Cl.
CPC ......... *H04N 9/3144* (2013.01); *H04N 9/3155* (2013.01)

(58) Field of Classification Search
CPC .... G03B 21/142; G03B 21/16; H04N 9/3144; H04N 9/3188
See application file for complete search history.

(56) References Cited

U.S. PATENT DOCUMENTS

| | | | | |
|---|---|---|---|---|
| 9,354,494 | B2 * | 5/2016 | Mashitani | H04N 9/3188 |
| 9,599,811 | B2 * | 3/2017 | Mizoguchi | G02B 26/08 |
| 10,303,043 | B2 * | 5/2019 | Yamamoto | H04N 9/3102 |
| 10,739,667 | B2 * | 8/2020 | Chen | G03B 21/005 |
| 11,069,315 | B2 * | 7/2021 | Hosaka | G09G 3/007 |
| 11,295,683 | B2 * | 4/2022 | Aoki | G09G 3/3607 |
| 12,149,871 | B2 * | 11/2024 | Aoki | G09G 5/391 |
| 12,267,633 | B2 * | 4/2025 | Wakabayashi | G02B 26/0875 |
| 2005/0128438 | A1 * | 6/2005 | Kang | H04N 9/3188 353/69 |

(Continued)

FOREIGN PATENT DOCUMENTS

| | | | |
|---|---|---|---|
| JP | H04317024 A | * | 11/1992 |
| JP | 2008-089904 A | | 4/2008 |

(Continued)

*Primary Examiner* — Bao-Luan Q Le

(74) *Attorney, Agent, or Firm* — Dority and Manning, P.A.

(57) ABSTRACT

A projector includes first to third panel modules, a light combiner, a projection optics module, and an optical path shifting module that shifts the optical path of projection image light enters the projection optics module. The optical path shifting module includes an optical path changing member, a first actuator that swings the optical path changing member around a first swing axis, and a second actuator that swings the optical path changing member around a second swing axis. The first panel module includes a liquid crystal panel for first light, a heat diffuser for first light, a thermoelectric conversion device for first light, and a cooler for first light. The first actuator and the second actuator are each disposed at a position separate from a side end facing the optical path shifting module out of the side ends of the thermoelectric conversion device for first light.

18 Claims, 19 Drawing Sheets

(56) References Cited

U.S. PATENT DOCUMENTS

| | | | | |
|---|---|---|---|---|
| 2005/0264501 | A1* | 12/2005 | Choi | G09G 3/002 345/84 |
| 2005/0264547 | A1* | 12/2005 | Choi | H04N 9/317 345/204 |
| 2005/0275810 | A1* | 12/2005 | Choi | G03B 21/005 353/69 |
| 2006/0007057 | A1* | 1/2006 | Choi | H04N 9/3179 345/9 |
| 2011/0234650 | A1* | 9/2011 | Watanabe | G09G 5/399 345/690 |
| 2014/0036239 | A1* | 2/2014 | Mashitani | H04N 9/312 353/101 |
| 2015/0264291 | A1* | 9/2015 | Tani | H04N 5/74 348/748 |
| 2016/0004071 | A1* | 1/2016 | Mizoguchi | H04N 9/3188 359/198.1 |
| 2016/0091773 | A1* | 3/2016 | Mizoguchi | G03B 21/14 359/199.1 |
| 2016/0124216 | A1* | 5/2016 | Kojima | G02B 26/105 156/60 |
| 2016/0124217 | A1* | 5/2016 | Kojima | G02B 26/085 359/199.1 |
| 2016/0187645 | A1* | 6/2016 | Mizoguchi | G02B 26/105 353/98 |
| 2016/0227176 | A1* | 8/2016 | Mizoguchi | G02B 26/0875 |
| 2016/0227177 | A1* | 8/2016 | Mizoguchi | G03B 21/142 |
| 2016/0363840 | A1* | 12/2016 | Mizoguchi | G09G 3/002 |
| 2016/0363841 | A1* | 12/2016 | Hino | G02B 27/0172 |
| 2017/0299883 | A1* | 10/2017 | Nonaka | G03B 21/142 |
| 2018/0047321 | A1* | 2/2018 | Hirakura | H04N 9/3188 |
| 2019/0066553 | A1* | 2/2019 | Ohkoba | G09G 3/007 |
| 2019/0227261 | A1* | 7/2019 | Smith | G02B 26/0841 |
| 2020/0145627 | A1* | 5/2020 | Hosaka | H04N 9/3105 |
| 2020/0159093 | A1* | 5/2020 | Wakabayashi | G01D 3/0365 |
| 2020/0159094 | A1* | 5/2020 | Wakabayashi | H02K 33/16 |
| 2020/0174246 | A1* | 6/2020 | Wakabayashi | G03B 21/006 |
| 2020/0174357 | A1* | 6/2020 | Chen | G03B 21/005 |
| 2020/0363707 | A1* | 11/2020 | Hirakura | G03B 21/142 |
| 2020/0371402 | A1* | 11/2020 | Hirakura | G02B 26/0833 |
| 2020/0371405 | A1* | 11/2020 | Yanagihara | H04N 9/3188 |
| 2021/0096449 | A1* | 4/2021 | Hirakura | H01F 7/0205 |
| 2021/0200071 | A1* | 7/2021 | Chang | G03B 21/145 |
| 2021/0247671 | A1* | 8/2021 | Wakabayashi | G03B 21/2066 |
| 2021/0294094 | A1* | 9/2021 | Wakabayashi | G02B 27/141 |
| 2022/0132084 | A1* | 4/2022 | Yanagisawa | G02B 26/0875 |
| 2022/0163756 | A1* | 5/2022 | Wakabayashi | H04N 23/687 |
| 2022/0163829 | A1* | 5/2022 | Wakabayashi | G02B 26/08 |
| 2022/0252828 | A1* | 8/2022 | Chen | G02B 7/1821 |
| 2022/0299848 | A1* | 9/2022 | Ito | H04N 9/3105 |
| 2023/0089186 | A1* | 3/2023 | Takada | G02B 26/0816 359/221.2 |

FOREIGN PATENT DOCUMENTS

| | | | | |
|---|---|---|---|---|
| JP | 2020-091343 | A | | 6/2020 |
| JP | 2021124544 | A | * | 8/2021 |
| JP | 2022-069064 | A | | 5/2022 |
| JP | 2022-144508 | A | | 10/2022 |

* cited by examiner

4
+Y
+Z
+X
45
FN
44
442
445
443
441
444
432
SC
435
436
43
431
433
434
42
422
425
421
424
426
427
423
41
4131
4132
412
411
413
PA 4
412
41
4131
PA
411
413
4116
421
425
42
426
427
424
422
423
SC
433
435
436
432
434
431
43
441
444
44
443
442
445
FN
45
+X
+Z
+Y

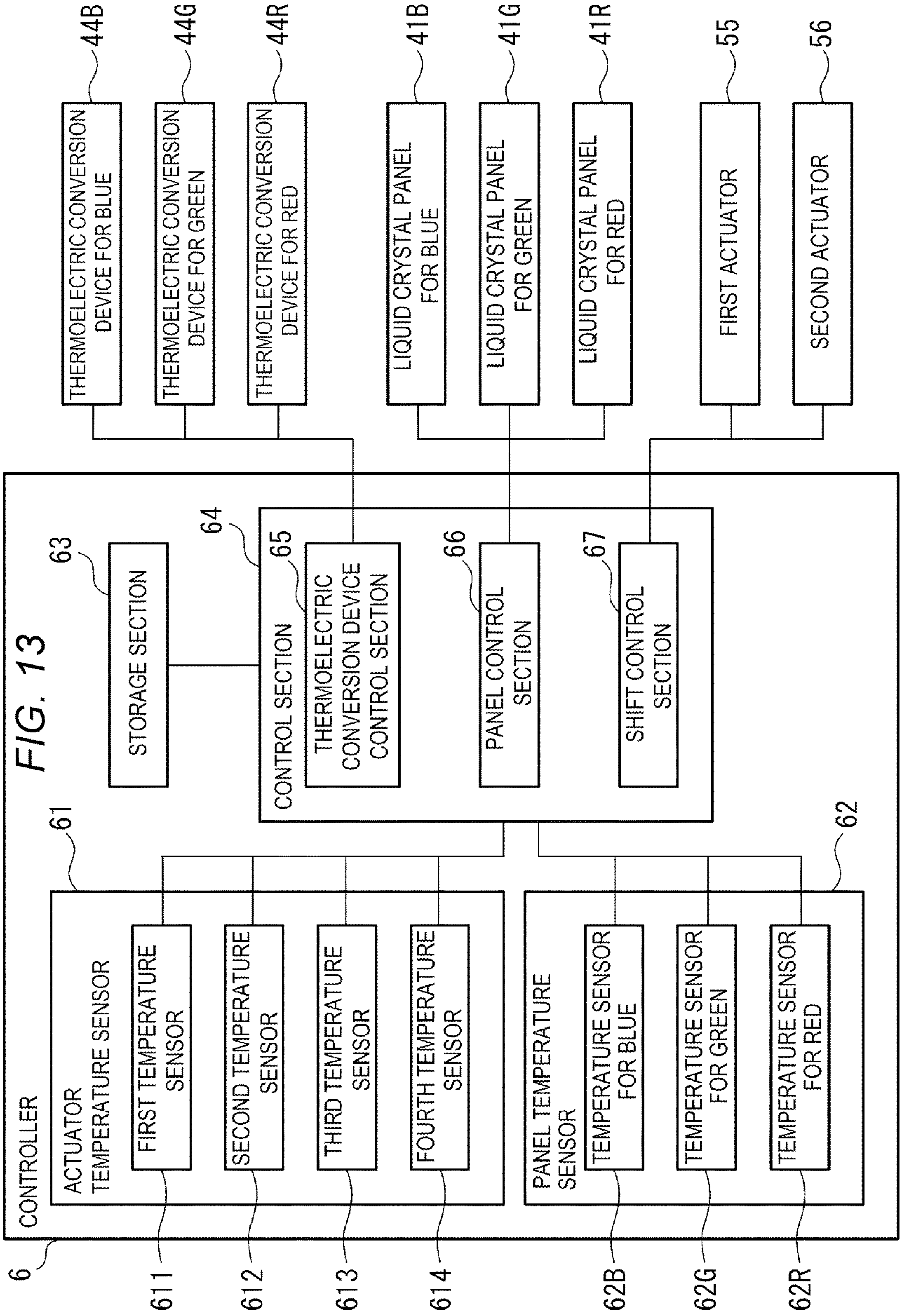

FIG. 13

6 CONTROLLER

61 ACTUATOR TEMPERATURE SENSOR

611 FIRST TEMPERATURE SENSOR

612 SECOND TEMPERATURE SENSOR

613 THIRD TEMPERATURE SENSOR

614 FOURTH TEMPERATURE SENSOR

62 PANEL TEMPERATURE SENSOR

62B TEMPERATURE SENSOR FOR BLUE

62G TEMPERATURE SENSOR FOR GREEN

62R TEMPERATURE SENSOR FOR RED

63 STORAGE SECTION

64 CONTROL SECTION

65 THERMOELECTRIC CONVERSION DEVICE CONTROL SECTION

66 PANEL CONTROL SECTION

67 SHIFT CONTROL SECTION

44B THERMOELECTRIC CONVERSION DEVICE FOR BLUE

44G THERMOELECTRIC CONVERSION DEVICE FOR GREEN

44R THERMOELECTRIC CONVERSION DEVICE FOR RED

41B LIQUID CRYSTAL PANEL FOR BLUE

41G LIQUID CRYSTAL PANEL FOR GREEN

41R LIQUID CRYSTAL PANEL FOR RED

55 FIRST ACTUATOR

56 SECOND ACTUATOR 4 (4R)
45
44R (445)
42
Ar2 (Ar2R)
351
56 (561)
563
562
43
41
Rx1
Rx2
552 553
55 (551)
55 (555)
556 557
4 (4B)
45
44B (444)
42
Ar1 (Ar1B)
351
567
566
56 (565)
43
41

PROJECTOR WITH THERMALLY MANAGED OPTICAL PATH SHIFTING MODULE AND THERMOELECTRIC PANEL COOLING

The present application is based on, and claims priority from JP Application Serial Number 2022-186674, filed Nov. 22, 2022, the disclosure of which is hereby incorporated by reference herein in its entirety.

BACKGROUND

1. Technical Field

The present disclosure relates to a projector.

2. Related Art

There has been a known projector capable of increasing the resolution of an image displayed on a projection receiving surface by swinging an optical element to shift the optical path of incident light (see JP-A-2020-91343, for example).

The projector described in JP-A-2020-91343 includes a light source, three liquid crystal display elements, a dichroic prism, an optical path shifting device, and a projection system. The dichroic prism outputs video light that is the combination of red light, green light, and blue light incident from the three liquid crystal display elements, and the projection system projects the incident video light onto a screen.

The optical path shifting device is disposed between the dichroic prism and the projection system, and shifts the optical path of the video light incident from the dichroic prism to increase the resolution of an image to be projected by the projection system to a value higher than the resolution of each of the liquid crystal display elements.

The optical path shifting device includes a glass plate, a first frame that holds the glass plate, a second frame that supports the first frame swingably around a first swing axis, a base member that supports the second frame swingably around a second swing axis, a first actuator, and a second actuator. The first and second swing axes are perpendicular to each other.

The first actuator includes a magnet held by the first frame and a coil held by the base member. The second actuator includes two vibrators, and the vibrators each include a magnet held by the second frame and a coil held by the base member.

When the coil of each of the actuators is energized, the magnet corresponding to the coil moves relative to the coil. The glass plate thus swings around the corresponding swing axis out of the first and second swing axes, so that the optical path of the video light is shifted. The glass plate then swings around each of the first and second swing axes to shift each pixel contained in the video light to four vertical and horizontal locations, so that the resolution of the video light can be quadrupled in a pseudo manner.

JP-A-2020-91343 is an example of the related art.

In the projector described in JP-A-2020-91343, to allow the optical path shifting device to increase the resolution of video light, it is necessary to operate the liquid crystal display elements and the optical path shifting device at a frequency higher than the frame rate of the video signal input to the projector.

For example, when the input video signal has a frame rate of 60 Hz, the liquid crystal display elements and the optical path shifting device need to operate at 240 Hz.

On one hand, the responsiveness of a liquid crystal material depends on the temperature characteristics thereof, and to cause the liquid crystal material to respond at the speed of 240 Hz, it is desired to adjust the temperature of the liquid crystal panel to an appropriate temperature in a short period so that the liquid crystal material is not affected by the environmental temperature.

On the other hand, when the temperature of a magnet increases, demagnetization it occurs, making difficult to operate the optical path shifting device at 240 Hz.

As described above, it is desired that a projector including an optical path shifting device having two swing axes has a configuration capable of displaying a pseudo-high-resolution image in correspondence with a high-speed response.

SUMMARY

A projector according to an aspect of the present disclosure include a first panel module that has a first axis as an optical axis and outputs first image light that is modulated first light, a second panel module that has a second axis perpendicular to the first axis as an optical axis and outputs second image light that is modulated second light, a third panel module that has the first axis as an optical axis and outputs third image light that is modulated third light, a light combiner having a first light incident surface on which the first image light is incident, a second light incident surface on which the second image light is incident, a third light incident surface on which the third image light is incident, and a light exiting surface which has the second axis as an optical axis and via which projection image light exits, the projection image light being a combination of the first image light, the second image light, and the third image light, a projection optics module that projects the projection image light output from the light combiner, and an optical path shifting module that shifts an optical path of the projection image light that is output from the light combiner and enters the projection optics module. The optical path shifting module includes an optical path changing member disposed in the optical path between the light combiner and the projection optics module, a first actuator that includes a first magnet and a first coil and swings the optical path changing member around a first swing axis along the first axis, and a second actuator that includes a second magnet and a second coil and swings the optical path changing member around a second swing axis along a third axis perpendicular to each of the first axis and the second axis. The first panel module includes a liquid crystal panel for first light that outputs the first image light, a heat diffuser for first light that extends from the liquid crystal panel for first light along the third axis, transfers heat to and from the liquid crystal panel for first light, and diffuses the received heat in the heat diffuser for light, first a thermoelectric conversion device for first light that transfers heat to and from the heat diffuser for first light, and a cooler for first light that cooperates with the heat diffuser for first light to sandwich the thermoelectric conversion device for first light and transfers heat to and from the thermoelectric conversion device for first light. The first actuator and the second actuator are each disposed at a position separate from a side end facing the optical path shifting module out of side ends of the thermoelectric conversion device for first light.

BRIEF DESCRIPTION OF THE DRAWINGS

FIG. 13 is a block diagram showing the configuration of a controller according to the first embodiment.

DESCRIPTION OF EMBODIMENTS

First Embodiment

A first embodiment of the present disclosure will be described below with reference to the drawings.

Schematic Configuration of Projector

Figure 1:
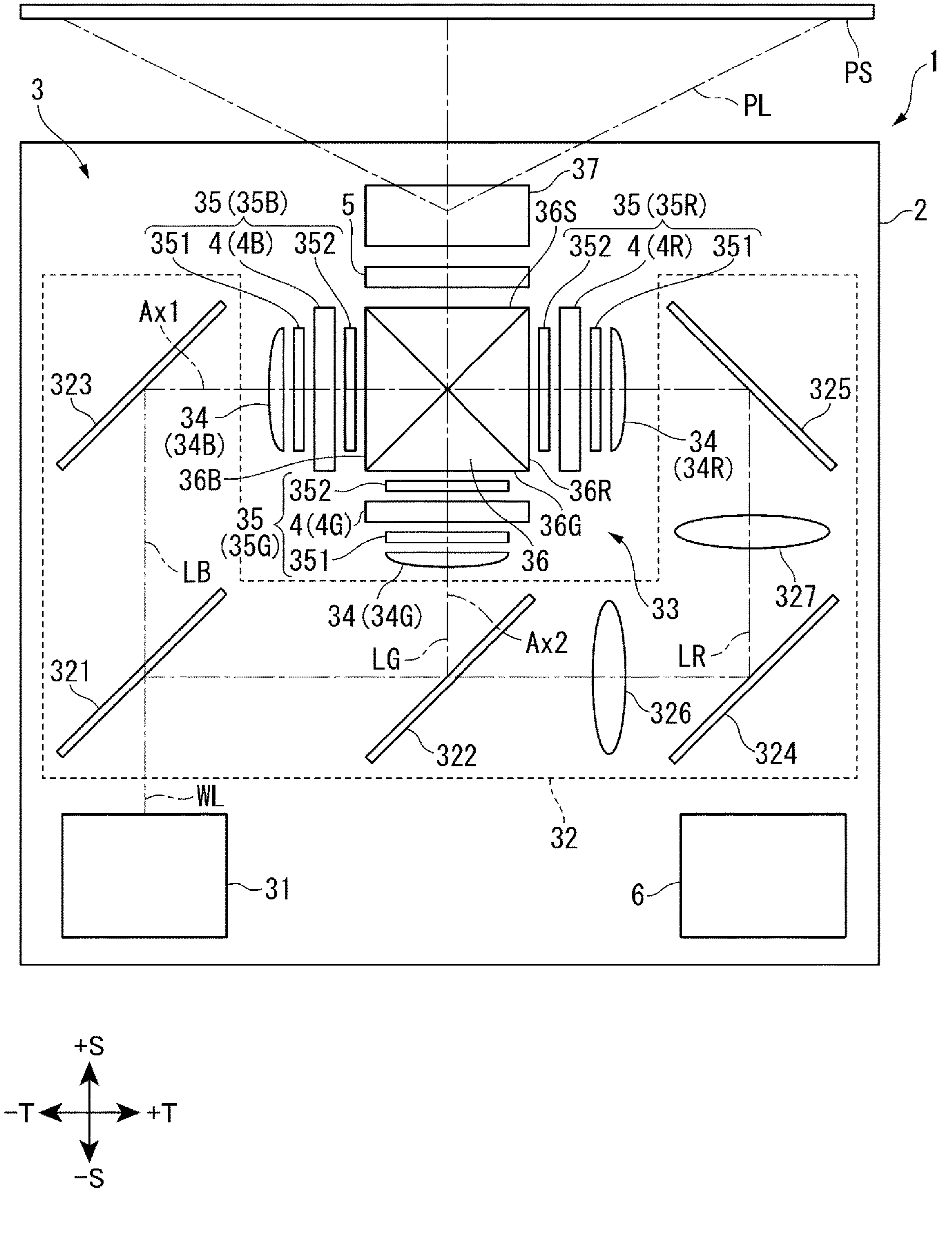
FIG. 1 is a diagrammatic view showing a schematic configuration of a projector according to a first embodiment.

FIG. 1 is a schematic view showing a schematic configuration of a projector 1 according to the present embodiment.

The projector 1 modulates a luminous flux output from a light source 31 to form projection image light according to image information, enlarges the formed projection image light PL, and projects the enlarged projection image light PL onto a projection receiving surface PS, such as a screen, as shown in FIG. 1. The projector 1 includes an exterior enclosure 2, and an image projection apparatus 3 and a controller 6 housed in the exterior enclosure 2. In addition to the components described above, the projector 1 includes, although not shown, a cooling apparatus that cools cooling targets, and a power supply apparatus that supplies electronic parts that constitute the projector 1 with electric power.

Configuration of Image Projection Apparatus

The image projection apparatus 3 forms and projects the projection image light PL described above. The image projection apparatus 3 includes the light source 31, a color separation module 32, an image formation unit 33, and a projection optics module 37.

It is assumed in the following description that the direction in which the light source 31 outputs illumination light WL is a direction S toward the positive end thereof, and that the direction perpendicular to the S toward the positive end thereof is a direction T toward the positive end thereof. It is further assumed that the opposite direction of the direction S toward the positive end thereof is a direction S toward the negative end thereof, and that the opposite direction of the direction T toward the positive end thereof is a direction T toward the negative end thereof. It is further assumed that an axis along the direction S toward the positive end thereof is an axis S, and that an axis along the direction T toward the positive end thereof is an axis T.

Configuration of Light Source

The light source 31 outputs the illumination light WL toward the positive end of the direction S. The configuration of the light source 31 may, for example, include a solid-state light emitter and a wavelength converter that converts the wavelength of the light emitted from the solid-state light emitter. The configuration of the light source 31 may instead, for example, include a discharge-type light emitting lamp, such as an ultrahigh-pressure mercury lamp.

Configuration of Color Separation Module

The color separation module 32 separates the illumination light WL incident from the light source 31 into three kinds of color light, blue light LB, green light LG, and red light LR. The color separation module 32 includes dichroic mirrors 321 and 322, total reflection mirrors 323, 324, and 325, and relay lenses 326 and 327.

Out of the illumination light WL incident from the light source 31, the dichroic mirror 321 transmits the blue light LB and reflects the green light LG and the red light LR toward the positive end of the direction T.

Out of the green light LG and the red light LR separated by the dichroic mirror 321, the dichroic mirror 322 reflects the green light LG toward the positive end of the direction S, and transmits the red light LR toward the positive end of the direction T. The green light LG reflected off the dichroic mirror 322 enters a green light modulation module 35G provided in the image formation unit 33.

The total reflection mirror 323 reflects the blue light LB having passed through the dichroic mirror 321 toward the positive end of the direction T. The blue light LB reflected off the total reflection mirror 323 enters a blue light modulation module 35B provided in the image formation unit 33.

The total reflection mirror 324 reflects the red light LR having passed through the dichroic mirror 322 toward the positive end of the direction S.

The total reflection mirror 325 reflects the red light LR reflected off the total reflection mirror 324 toward the negative end of the direction T. The red light LR reflected off the total reflection mirror 325 enters a red light modulation module; provided in the image formation unit 33.

The relay lens 326 is disposed between the dichroic mirror 322 and the total reflection mirror 324 in the optical path of red light LR, and the relay lens 327 is disposed between the total reflection mirror 324 and the total reflection mirror 325 in the optical path of red light LR. The relay lenses 326 and 327 compensate for the optical loss of the red light LR due to the fact that the optical path of the red light LR is longer than the optical path of blue light LB and the optical path of green light LG.

Configuration of Image Formation Unit

The image formation unit 33 separately modulates the incident blue light LB, green light LG, and red light LR, and combines the modulated color light LB, color light LG, and color light LR with one another to form the projection image light PL to be projected by the projection optics module 37. The image formation unit 33 includes field lenses 34, the light modulation modules 35, a light combiner 36, and an optical path shifting module 5.

Configuration of Field Lenses

The field lenses 34 each parallelize the light incident thereon. The image formation unit 33 includes three field lenses 34. The three field lenses 34 include a field lens 34B provided in the optical path of the blue light LB, a field lens 34G provided in the optical path of the green light LG, and a field lens 34R provided in the optical path of the red light LR. The color light LR having passed through the field lens 34R enters the light modulation module 35 dedicated for the color light, so do the color light LG having passed through the field lens 34G, and the color light LB having passed through the field lens 34B.

Configuration of Light Modulation Modules

The light modulation modules 35 each modulate color light incident thereon to form image light according to image information, and output the formed image light to the light combiner 36. The image formation unit 33 includes three light modulation modules 35. The three light modulation modules 35 include a blue light modulation module 35B, which modulates the blue light LB and outputs blue image light, a green light modulation module 35G, which modulates the green light LG and outputs green image light, and a red light modulation module 35R, which modulates the red light LR and outputs red image light.

The light modulation modules 35 each include a panel module 4, a light-incident-side polarizer 351, and a light-exiting-side polarizer 352.

Specifically, the blue light modulation module 35B includes a panel module 4B for blue, which modulates the blue light LB, the light-incident-side polarizer 351, which is disposed on the light incident side of the panel module 4B for blue, and the light-exiting-side polarizer 352, which is disposed on the light exiting side of the panel module 4B for blue. The panel module 4B for blue, the optical axis of which is a first axis Ax1 along the axis T, outputs the blue image light toward the positive end of the direction T.

The green light modulation module 35G includes a panel module 4G for green, which modulates the green light LG, the light-incident-side polarizer 351, and the light-exiting-side polarizer 352. The panel module 4G for green, the optical axis of which is a second axis Ax2 along the axis S, outputs the green image light toward the positive end of the direction S.

The red light modulation module 35R includes a panel module 4R for red, which modulates the red light LR, the light-incident-side polarizer 351, and the light-exiting-side polarizer 352. The panel module 4R for red, the optical axis of which is the first axis Ax1, outputs the red image light toward the negative end of the direction T.

In the present embodiment, out of the panel module 4B for blue and the panel module 4R for red, one panel module 4 corresponds to a first panel module, and the other panel module 4 corresponds to a second panel module. The green panel module 4G corresponds to a third panel module.

The configuration of the panel modules 4 will be described later in detail.

Configuration of Light Combiner

The light combiner 36 combines the blue image light incident from the blue light modulation module 35B, the green image light incident from the green light modulation module 35G, and the red image light incident from the red light modulation module 35R with one another to form the projection image light PL, and outputs the formed projection image light PL toward the optical path shifting module 5. That is, the light combiner 36 outputs the formed projection image light PL toward the projection optics module 37.

The light combiner 36 is formed of a cross dichroic prism having a substantially box-like shape. The light combiner 36 has a blue light incident surface 36B, a green light incident surface 36G, a red light incident surface 36R, and a light exiting surface 36S.

The blue light incident surface 36B is a surface of the light combiner 36 and faces the negative end of the direction T. The blue image light is incident on the blue light incident surface 36B.

The green light incident surface 36G is a surface of the light combiner 36 and faces the negative end of the direction S. The green image light is incident on the green light incident surface 36G.

The red light incident surface 36R is a surface of the light combiner 36, faces the positive end of the direction T, and is opposite from the blue light incident surface 36B. The red image light is incident on the red light incident surface 36R.

The light exiting surface 36S is a surface of the light combiner 36, faces the positive end of the direction S, and is opposite from the green light incident surface 36G. The light exiting surface 36S, the optical axis of which is the second axis Ax2, causes the projection image light PL to exit.

Schematic Configuration of Optical Path Shifting Module

The optical path shifting module 5 is disposed between the light combiner 36 and the projection optics module 37. The optical path shifting module 5 shifts the optical path of the projection image light PL incident from the light combiner 36 to increase the resolution of a projection image displayed by using the projection image light PL projected onto the projection receiving surface PS. The configuration and effect of the optical path shifting module 5 will be described later in detail.

Configuration of Projection Optics Module

The projection optics module 37 projects the projection image light PL incident from the light combiner 36 via the optical path shifting module 5 onto the projection receiving surface PS. Although not shown, the projection optics module 37 can, for example, be a unit lens including a plurality of lenses and a lens barrel that holds the plurality of lenses.

Configuration of Panel Modules

Figure 2:
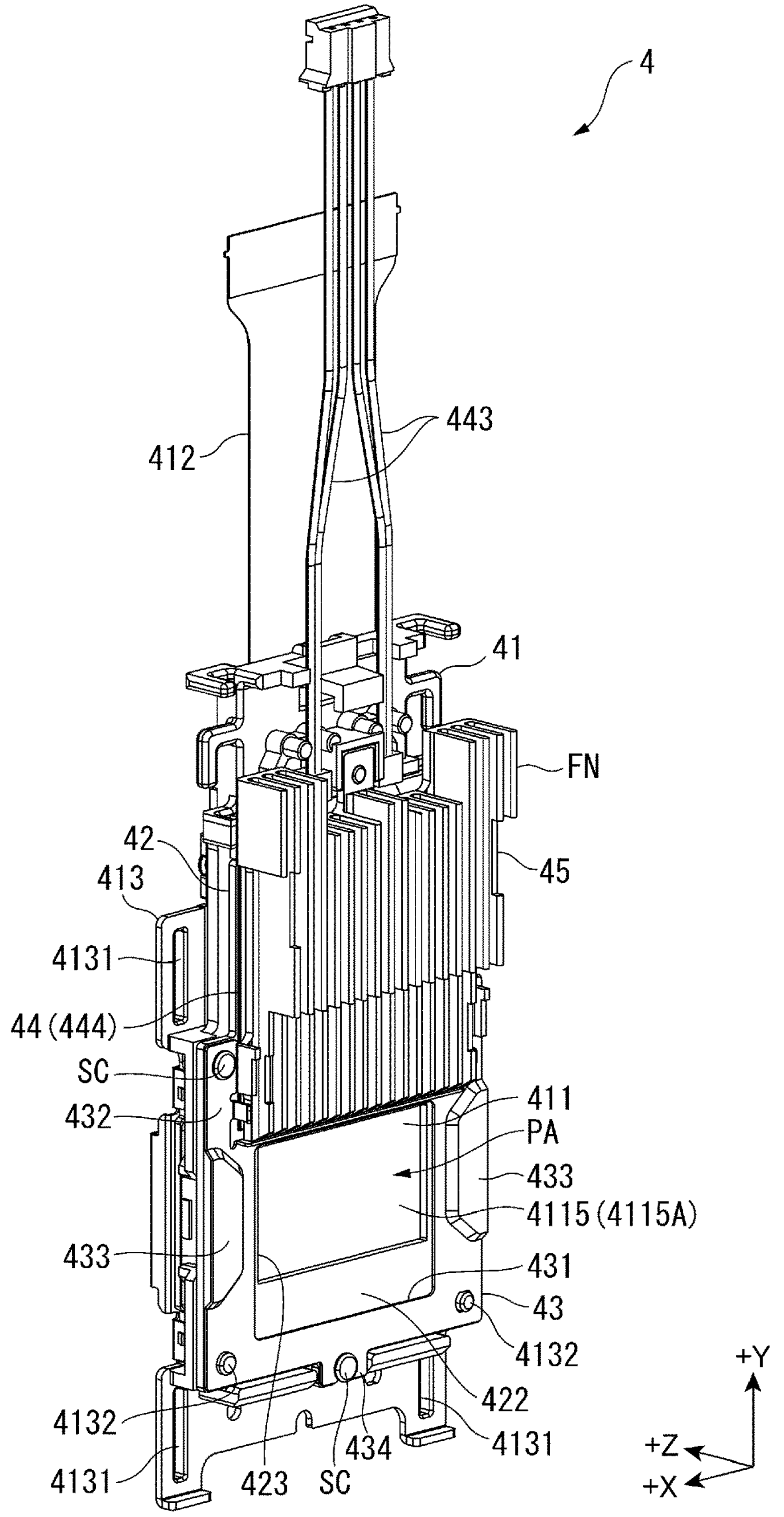
FIG. 2 is a perspective view showing a panel module according to the first embodiment.
Figure 3:
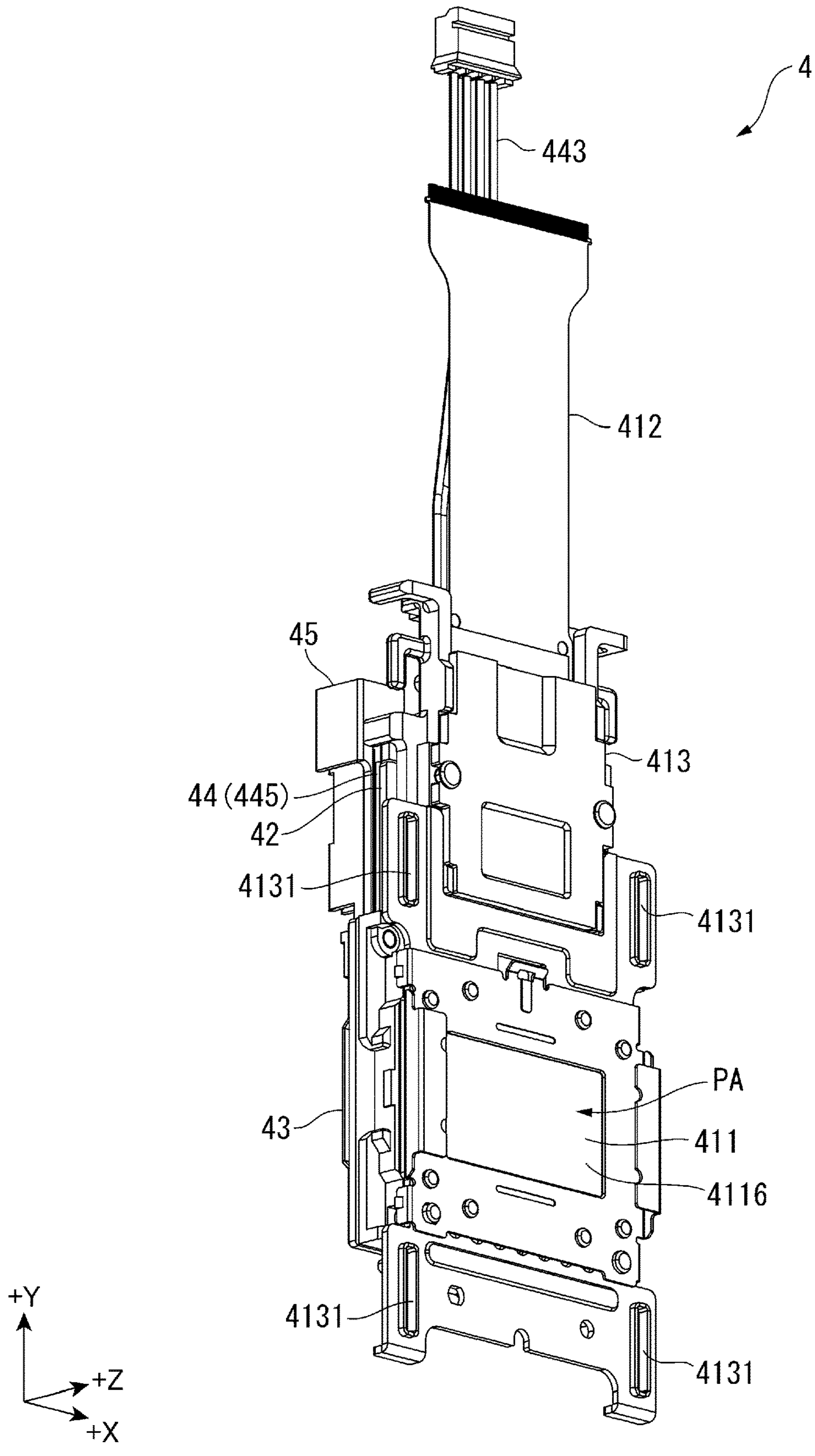
FIG. 3 is another perspective view showing the panel module according to the first embodiment.
Figure 4:
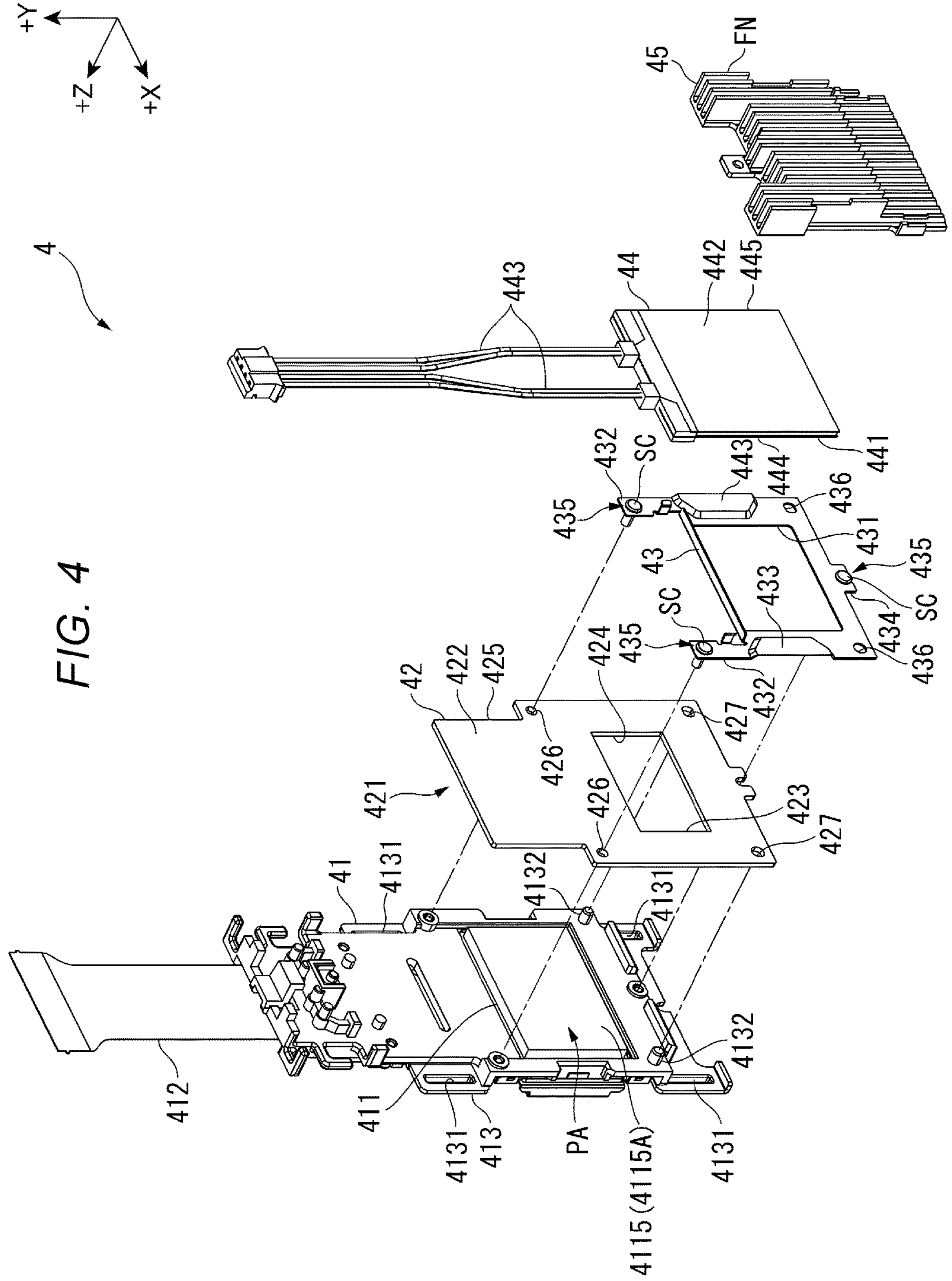
FIG. 4 is an explosive perspective view showing the panel module according to the first embodiment.
Figure 5:
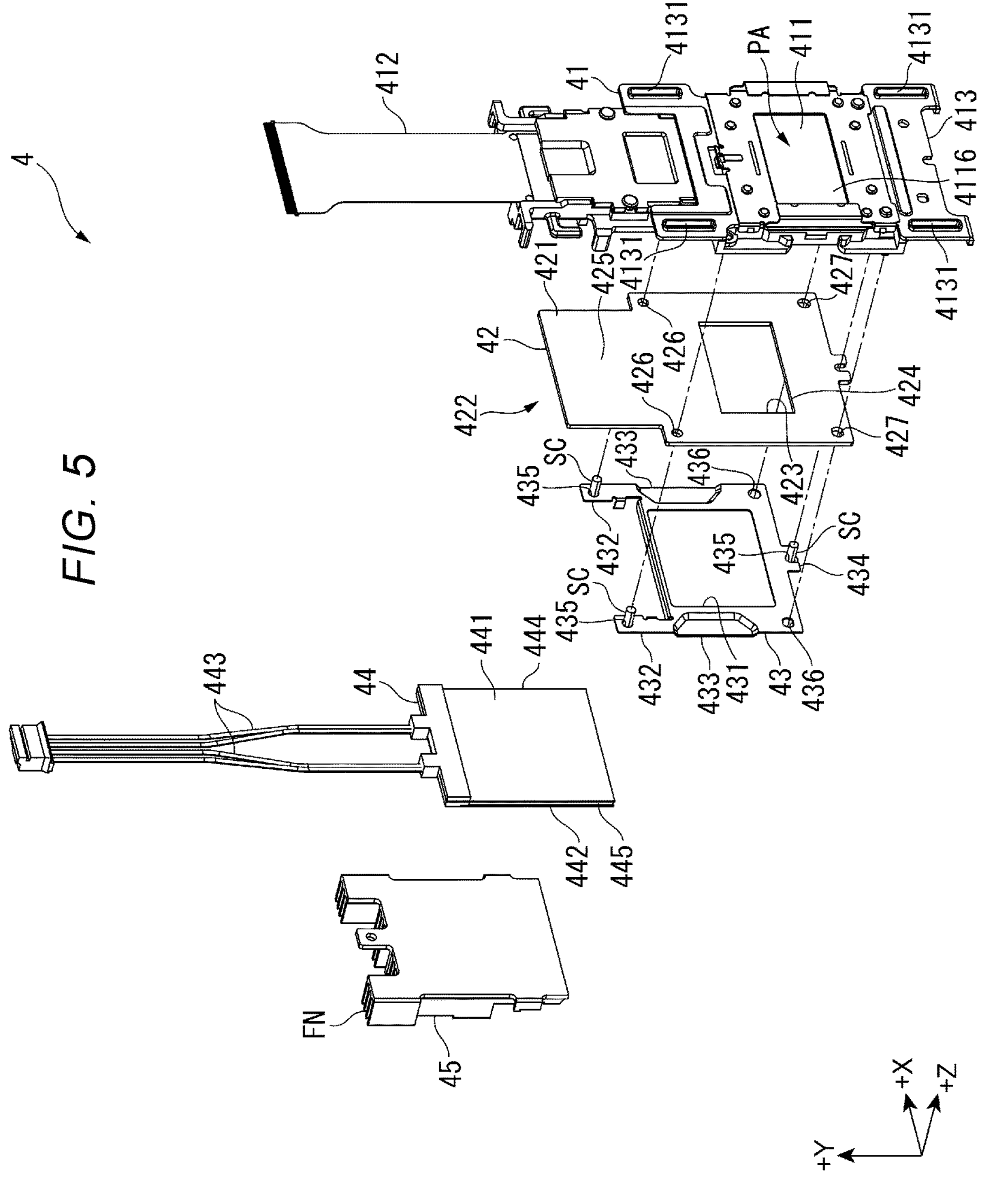
FIG. 5 is another explosive perspective view showing the panel module according to the first embodiment.

FIG. 2 is a perspective view showing one of the panel modules 4 viewed from the light incident side, and FIG. 3 is a perspective view showing the panel module 4 viewed from the light exiting side. FIG. 4 is an explosive perspective view showing the panel module 4 viewed from the light incident side, and FIG. 5 is an explosive perspective view showing the panel module 4 viewed from the light exiting side.

The panel module 4 includes a liquid crystal panel 41, a heat diffuser 42, a holding member 43, a thermoelectric conversion device 44, and a cooler 45, as shown in FIGS. 2 to 5.

In the following description, three directions perpendicular to one another are called a direction X toward the positive end thereof, a direction Y toward the positive end thereof, and a direction Z toward the positive end thereof. In the present embodiment, it is assumed that the direction Z toward the positive end thereof is the traveling direction of the light to be incident on the panel module 4. It is further assumed that the direction X toward the positive end thereof is the leftward direction when the panel module 4 is viewed along the direction Z toward the positive end thereof with the direction Y toward the positive end thereof coinciding with the upward direction. Although not shown, the opposite direction of the direction X toward the positive end thereof is a direction X toward the negative end thereof, the opposite direction of the direction Y toward the positive end thereof is a direction Y toward the negative end thereof, and the opposite direction of the direction Z toward the positive end thereof is a direction Z toward the negative end thereof. That is, the direction Z toward the positive end thereof with respect to the panel module 4 is the direction in which the light exits out of the panel module 4, and the direction Z toward the negative end thereof with respect to the panel module 4 is the direction in which the light is incident on the panel module 4.

The axis along the direction X toward the positive or negative end thereof is an axis X, the axis along the direction Y toward the positive or negative end thereof is an axis Y, and the axis along the direction Z toward the positive or negative end thereof is an axis Z.

In the panel module 4B for blue, the direction Z toward the positive end thereof is the direction T toward the positive end thereof, and the direction X toward the positive end thereof is the direction S toward the positive end thereof. In the panel module 4G for green, the direction Z toward the positive end thereof is the direction S toward the positive end thereof, and the direction X toward the positive end thereof is the direction T toward the negative end thereof. In the panel module 4R for red, the direction Z toward the positive end thereof is the direction T toward the negative end thereof, and the direction X toward the positive end thereof is the direction S toward the negative end thereof.

Configuration of Liquid Crystal Panels

Figure 6:
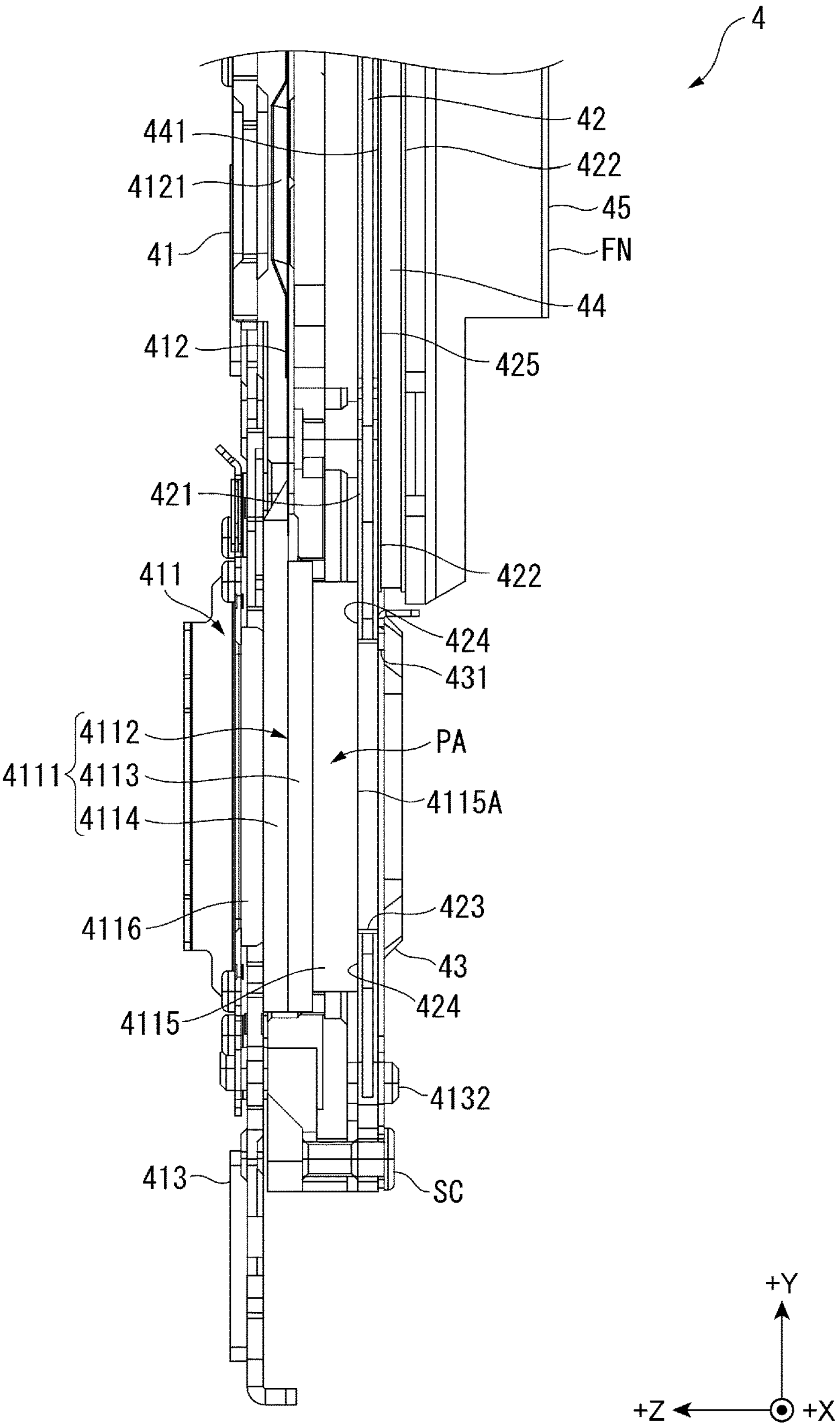
FIG. 6 is a cross-sectional view showing the panel module according to the first embodiment.

FIG. 6 shows a cross section of each of the panel modules 4 taken along the plane YZ.

The liquid crystal panel 41 is a transmissive liquid crystal panel that modulates color light incident thereon and outputs the modulated color light as image light along the traveling direction of the incident color light. The liquid crystal panel 41 includes a panel body 411, a flexible printed circuit (FPC) 412, and a holding frame 413, as shown in FIG. 6.

The panel body 411 modulates the incident light when the light passes therethrough. The panel body 411 includes an optically affecting section 4111, a light-incident-side dustproof substrate 4115, a light-exiting-side dustproof substrate 4116, the latter two of which sandwich the optically affecting section 4111 along the axis Z.

The optically affecting section 4111 includes a liquid crystal layer 4112, a counter substrate 4113, and a pixel substrate 4114, the latter two of which sandwich the liquid crystal layer 4112 along the axis Z.

The liquid crystal layer 4112 is formed of liquid crystal molecules encapsulated between the counter substrate 4113 and the pixel substrate 4114.

The counter substrate 4113 is disposed at the light incident side of the liquid crystal layer 4112. The counter substrate 4113 is provided with a counter electrode at the surface facing the liquid crystal layer 4112.

The pixel substrate 4114 is disposed at the light exiting side of the liquid crystal layer 4112. The pixel substrate 4114 is provided with a plurality of pixel electrodes at the surface facing the liquid crystal layer 4112. When viewed in the direction Z toward the negative end thereof, which is the direction toward the light incident side, the region of the optically affecting section 4111 where the plurality of pixel electrodes are disposed is a pixel region PA, and one pixel is formed by the region of the pixel region PA where the corresponding one of the pixel electrodes is disposed.

The counter substrate 4113 and the pixel substrate 4114 are coupled to the FPC 412, and the arrangement of the liquid crystal molecules, which form the liquid crystal layer 4112, is changed in accordance with an image signal supplied from the FPC 412. The optically affecting section 4111 thus modulates the light incident thereon.

The light-incident-side dustproof substrate 4115 is a light transmissive substrate provided at a portion of the light incident surface of the counter substrate 4113, the portion corresponding to the pixel region PA. When the liquid crystal panel 41 is viewed in the direction Z toward the negative end thereof, the light-incident-side dustproof substrate 4115 is provided so as to cover the pixel region PA and be capable of transferring heat to the light incident surface of the counter substrate 4113. The light-incident-side dustproof substrate 4115 suppresses adhesion of dust and other foreign matter to the light incident surface of the counter substrate 4113 and contamination of the image light with shadows of the dust and other foreign matter.

The heat diffuser 42, which will be described later, is coupled to the light-incident-side dustproof substrate 4115. In detail, a light incident surface 4115A of the light-incident-side dustproof substrate 4115 is in contact with a contact section 424 of the heat diffuser 42 in a heat transferrable manner. The light incident surface 4115A is a heat transfer surface via which heat generated in the optically affecting section 4111 is transferred to the heat diffuser 42. That is, the liquid crystal panel 41 includes the panel body 411, which outputs the light incident thereon, and the light incident surface 4115A as the heat transfer surface via which heat of the panel body 411 is transferred.

The light-exiting-side dustproof substrate 4116 is a light transmissive substrate provided at a portion of the light exiting surface of the pixel substrate 4114, the portion corresponding to the pixel region PA. When the liquid crystal panel 41 is viewed in the direction Z toward the positive end thereof, the light-exiting-side dustproof substrate 4116 is provided so as to cover the pixel region PA and be capable of transferring heat to the light exiting surface of the pixel substrate 4114. The light-exiting-side dustproof substrate 4116 suppresses adhesion of dust and other foreign matter to the light exiting surface of the pixel substrate 4114 and contamination of the image light with shadows of the dust and other foreign matter, and dissipates the heat transferred from the pixel substrate 4114 out of the liquid crystal panel 41.

The FPC 412 extends from the counter substrate 4113 and the pixel substrate 4114 toward the positive end of the direction Y and is coupled to the controller 6, as shown in FIG. 6. The FPC 412 includes a driver circuit 4121, which drives the optically affecting section 4111, and the driver circuit 4121 outputs a drive signal according to the image signal input from the controller 6 to the pixel substrate 4114.

The holding frame 413 holds the panel body 411 and the FPC 412, and also supports the heat diffuser 42, the holding member 43, the thermoelectric conversion device 44, and the cooler 45. The holding frame 413 is formed in a rectangular shape elongated along the axis Y when viewed from the light exiting side, as shown in FIGS. 3 and 5. The holding frame 413 has, although not shown, an opening through which the light that enters the panel body 411 and the light that exits out of the panel body 411 passes.

The holding frame 413 has four through ports 4131, which pass through the holding frame 413 along the axis Z. Arms of support members that are not shown but are provided at the light combiner 36 are inserted into the four through ports 4131. The support members are provided at each of the blue light incident surface 36B, the green light incident surface 36G, and the red light incident surface 36R of the light combiner 36, and inserting the arms of the support members into the through holes 4131 integrates the light combiner 36 with the three panel modules 4B, 4G, and 4R.

Configuration of Heat Diffuser

The heat diffuser 42 receives the heat of the panel body 411 via the light incident surface 4115A of the light-incident-side dustproof substrate 4115 and diffuses the received heat in the heat diffuser 42. The heat diffuser 42 is formed substantially in a rectangular shape elongated along the axis Y when viewed in the direction Z toward the positive end thereof, and is disposed at the light incident side of the liquid crystal panel 41, as shown in FIGS. 4 and 5. In detail, the heat diffuser 42 is disposed between the panel body 411 and the thermoelectric conversion device 44 and conveys the heat. That is, the heat diffuser 42 extends from the liquid crystal panel 41 along the axis Y, transfers the heat to and from the liquid crystal panel 41, and diffuses the received heat in the heat diffuser 42.

The heat diffuser 42 has a first surface 421, a second surface 422, an opening 423, the contact section 424, an extension 425, two holes 426, and two holes 427.

The first surface 421 is a surface facing the panel body 411 of the liquid crystal panel 41 out of the surfaces of the heat diffuser 42. In other words, the first surface 421 is a light-exiting-side surface of the heat diffuser 42.

The second surface 422 is a surface of the heat diffuser 42 and faces the side opposite from the first surface 421. The holding member 43 and the thermoelectric conversion device 44, which will be described later, are in contact with the second surface 422.

The opening 423 allows the light incident on the panel body 411 to pass therethrough toward the positive end of the direction Z with the heat diffuser 42 attached to the holding frame 413. That is, the opening 423 is a through port passing through the heat diffuser 42 along the direction Z toward the positive end thereof. The opening 423 is formed substantially in a rectangular shape corresponding to the pixel region PA when viewed from the light incident side.

The contact section 424 is provided at the circumferential edge of the opening 423 of the first surface 421. The contact section 424 is in contact with the light incident surface 4115A, which is the heat transfer surface, and receives the heat of the panel body 411 via the light incident surface 4115A. As long as the contact section 424 can receive the heat of the panel body 411, any portion of the panel body 411 may be the contact portion where the panel body 411 is in contact with the contact section 424. For example, the contact portion 424 may be in contact with the circumferential surface of the light-incident-side dust-proof substrate 4115 that extends along the circumferential direction around the axis Z.

The extension 425 is a portion of the heat diffuser 42 that extends from the contact section 424 in a direction that intersects with the direction in which the light is incidence on the panel body 411. In detail, the extension 425 is a portion extending from the contact section 424 in a direction away from the pixel region PA, which outputs the image light, of the liquid crystal panel 41. Specifically, the extension 425 is a portion extending from the contact section 424 toward the positive end of the direction Y, which intersects with the axis Z.

In the heat diffuser 42, the heat of the panel body 411 received by the contact section 424 diffuses into the extension 425. The heat diffused into the extension 425 is then absorbed by the thermoelectric conversion device 44 provided at the second surface 422.

The two holes 426 are provided shifted from the opening 423 toward the positive end of the direction Y. Screws SC, which are threaded into the holding frame 413, are inserted into the two holes 426.

The two holes 427 are provided shifted from the opening 423 toward the negative end of the direction Y. Protrusions 4132 provided at the holding frame 413 are inserted into the two holes 427, as shown in FIG. 4. That is, the protrusions 4132 are positioning protrusions, and the two holes 427 are positioning holes.

In the present embodiment, the heat diffuser 42 is a vapor chamber including a sealed enclosure that encapsulates a working fluid changeable between gas and liquid phases, but not necessarily. The heat diffuser 42 may be a plate-shaped body made of metal having high thermal conductivity.

Configuration of Holding Member

The holding member 43 is formed in the shape of a substantially rectangular frame, as shown in FIGS. 4 and 5. The holding member 43 is fixed to the holding frame 413 with the screws SC and holds the light-incident-side polarizer 351 shown in FIG. 1 at the light incident side of the panel body 411. The holding member 43 has an opening 431, two arms 432, two fixing sections 433, a protrusion 434, three holes 435, and two holes 436.

The opening 431 is a rectangular opening and is provided at a position corresponding to the pixel region PA with the holding member 43 fixed to the holding frame 413. The light output from the light-incident-side polarizer 351 toward the negative end of the direction Z passes through the opening 431 and further passes through the opening 423 of the heat diffuser 42, and is incident on the pixel region PA of the panel body 411.

One of the two arms 432 protrudes toward the positive end of the direction Y from an end portion, which faces the positive end of the direction X, of the holding member 43, and the other arm 432 protrudes toward the positive end of the direction Y from an end portion, which faces the negative end of the direction X, of the holding member 43.

One of the two fixing sections 433 is provided at a position shifted from the opening 431 toward the positive end of the direction X, and the other fixing section 433 is provided at a position shifted from the opening 431 toward the negative end of the direction X. The fixing sections 433 protrude toward the negative end of the direction Z, and fix the light-incident-side polarizer 351 at the light incident side of the holding member 43, for example, with an adhesive.

The protrusion 434 protrudes toward the negative end of the direction Y from the center, along the axis X, of the holding member 43.

Two of the three holes 435 are provided at the two arms 432, and the remaining one hole 435 is provided at the protrusion 434. The screws SC, which are threaded into the holding frame 413, are inserted into the holes 435 along the direction Z toward the positive end thereof.

The two holes 436 are provided at the corners shifted from the opening 431 toward the negative end of the direction Y. The protrusions 4132, which are provided at the holding frame 413 and serve the positioning protrusions, are inserted into the two holes 436. That is, the two holes 436 are positioning holes.

The holding member 43 is fixed along with the heat diffuser 42 to the holding frame 413 and holds the light-incident-side polarizer 351, as described above.

Configuration of Thermoelectric Conversion Device

The thermoelectric conversion device 44 is coupled to the heat diffuser 42 and transfers the heat to and from the heat diffuser 42. Specifically, the thermoelectric conversion device 44 absorbs heat from the heat diffuser 42 and transfers heat to the heat diffuser 42. The thermoelectric conversion device 44 has a first surface 441, a second surface 442, and lead wires 443, as shown in FIGS. 4 and 5.

The first surface 441 is a surface facing the heat diffuser 42 out of the surfaces of the thermoelectric conversion device 44. In detail, the first surface 441 is a surface of the thermoelectric conversion device 44 and is in contact with the extension 425. In other words, the first surface 441 is a surface facing the positive end of the direction Z out of the surfaces of the thermoelectric conversion device 44.

The second surface 442 is a surface of the thermoelectric conversion device 44 and faces the side opposite from the first surface 441. In other words, the second surface 442 is a surface facing the negative end of the direction Z out of the surfaces of the thermoelectric conversion device 44. The cooler 45 is in contact with the second surface 442.

The lead wires 443 extend toward the positive end of the direction Y from the end facing the positive end of the direction Y out of the ends of thermoelectric conversion device 44. The lead wires 443 are coupled to the controller 6, which will be described later. That is, the operation of the thermoelectric conversion device 44 is controlled by the controller 6.

The thus configured thermoelectric conversion device 44 actively absorbs via the first surface 441 the heat transferred from the extension 425 with the aid of electric power supplied along the lead wires 443, and dissipates the absorbed heat to the cooler 45 via the second surface 442.

In the present embodiment, the thermoelectric conversion device 44 is a Peltier element. Reversing the polarity of the thermoelectric conversion device 44 therefore allow heat to be supplied to the extension 425 via the first surface 441. That is, the thermoelectric conversion device 44 can heat the panel body 411 of the liquid crystal panel 41 via the heat diffuser 42. When heat is supplied to the heat diffuser 42 via the first surface 441, the second surface 442 serves as a heat absorbing surface and absorbs heat from the cooler 45. The cooler 45 is coupled to thermoelectric conversion device 44, but is not coupled to the heat diffuser 42 or the liquid crystal panel 41. Since the thermoelectric conversion device 44 serves as a heat insulating member, the cooling effect provided by the thermoelectric conversion device 44 does not act on the panel body 411 when the thermoelectric conversion device 44 heats the panel body 411.

Figure 7:
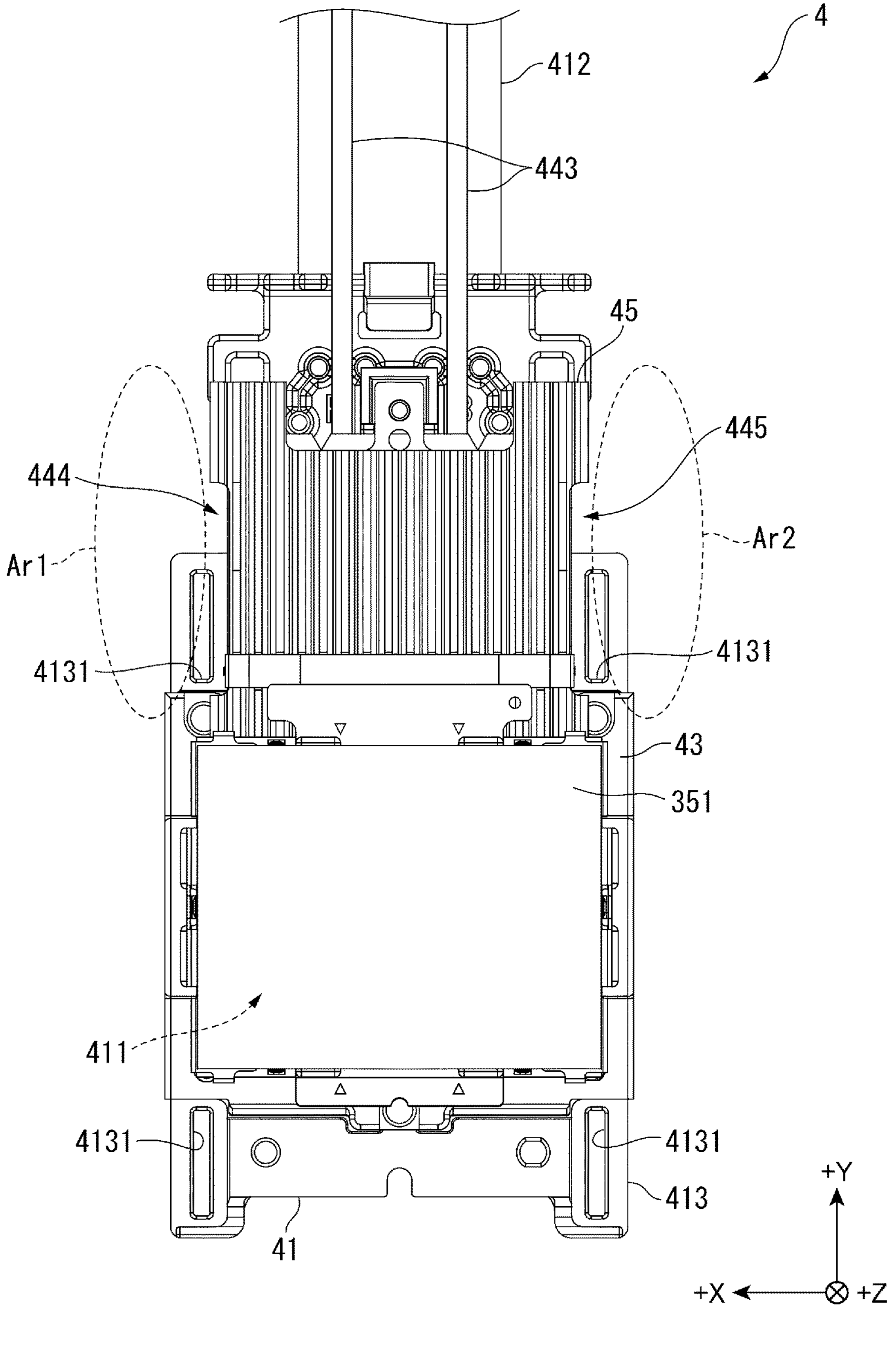
FIG. 7 shows the panel module according to the first embodiment.

FIG. 7 shows the panel module 4 viewed from the light incident side.

Note that the thermoelectric conversion device 44 has a side end 444 facing the positive end of the direction X and a side end 445 facing the negative end of the direction X, with the two side ends exposed to the exterior of the panel module 4, as shown in FIGS. 2 and 3. Therefore, when the thermoelectric conversion device 44 absorbs the heat generated by the panel body 411 and transferred to the heat diffuser 42, and when the thermoelectric conversion device 44 heats the panel body 411 via the heat diffuser 42, heat is radiated via the side ends 444 and 445.

A region Ar1 in the vicinity of the side end 444 and outside the panel module 4 and a region Ar2 in the vicinity of the side end 445 and outside the panel module 4, as shown in FIG. 7, are therefore relatively high temperature regions.

In contrast, first magnets 552 and 556 and second magnets 562 and 566 of the optical path shifting module 5 are disposed at positions separate from the regions Ar1 and Ar2, and the arrangement will be described later in detail.

Configuration of Cooler

The cooler 45 and the heat diffuser 42 sandwich the thermoelectric conversion device 44, and the cooler 45 transfers the heat to and from the thermoelectric conversion device 44. Specifically, the cooler 45 is coupled to the second surface 442 of the thermoelectric conversion device 44 and dissipates the heat transferred from the thermoelectric conversion device 44. In the present embodiment, the cooler 45 is a heat sink with a plurality of fins FN, as shown in FIGS. 2 and 4.

Correspondence Between Configurations of Each Optical Modulation Module

The panel modules 4 each include the liquid crystal panel 41, the heat diffuser 42, the holding member 43, the thermoelectric conversion device 44, and the cooler 45, as described above.

That is, the blue light modulation module 35B includes the panel module 4B for blue, the blue-light-incident-side polarizer 351, and the blue-light-exiting-side polarizer 352, and the panel module 4B for blue includes the liquid crystal panel 41, which modulates blue light, the heat diffuser 42, the holding member 43, the thermoelectric conversion device 44, and the cooler 45.

When the panel module 4B for blue corresponds to the first panel module, the blue light corresponds to first light, and the liquid crystal panel 41, the heat diffuser 42, the thermoelectric conversion device 44, and the cooler 45 of the panel module 4B for blue correspond to a liquid crystal panel for first light, a heat diffuser for first light, a thermoelectric conversion device for first light, and a cooler for first light.

When the panel module 4R for red corresponds to the third panel module, the red light corresponds to third light, and the liquid crystal panel 41, the heat diffuser 42, the thermoelectric conversion device 44, and the cooler 45 of the panel module 4R for red correspond to a liquid crystal panel for third light, a heat diffuser for third light, a thermoelectric conversion device for third light, and a cooler for third light.

The panel module 4G for green corresponds to the second panel module, as described above. The green light corresponds to second light, and the liquid crystal panel 41, the heat diffuser 42, the thermoelectric conversion device 44, and the cooler 45 of the panel module 4G for green correspond to a liquid crystal panel for second light, a heat diffuser for second light, a thermoelectric conversion device for second light, and a cooler for second light.

Configuration of Optical Path Shifting Module

Figure 8:
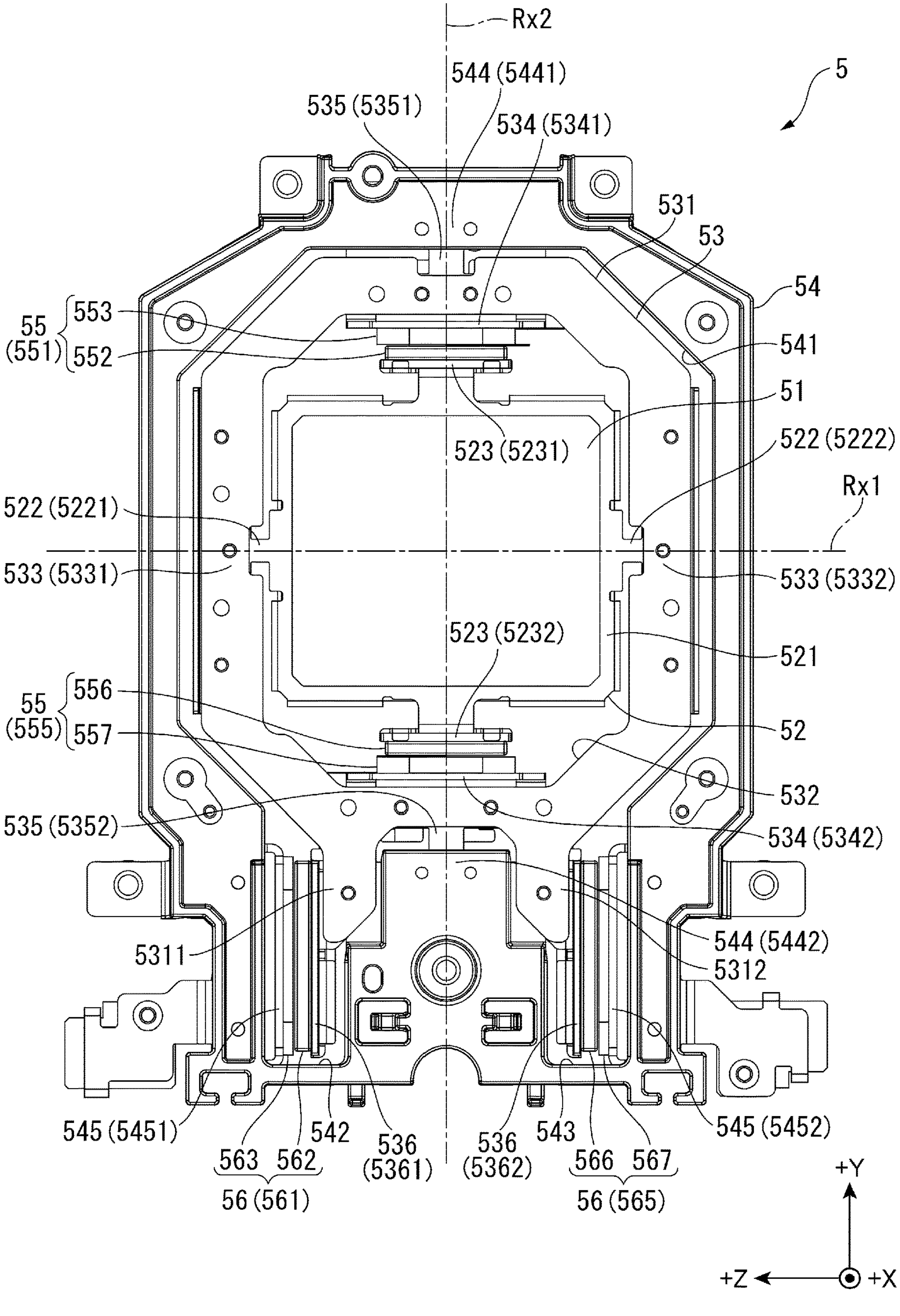
FIG. 8 shows an optical path shifting module according to the first embodiment.

FIG. 8 shows the optical path shifting module 5 viewed from the light exiting side.

The optical path shifting module 5 shifts the optical path of projection image light that is output from the light combiner 36 and enters the projection optics module 37. The optical path shifting module 5 includes an optical path changing member 51, a first movable section 52, a second movable section 53, a base 54, a first actuator 55, and a second actuator 56, as shown in FIG. 8.

Note that FIG. 8 shows the direction X toward the positive end thereof, the direction Y toward the positive end thereof, and the direction Z toward the positive end thereof in the panel module 4B for blue, which constitutes, along with the optical path shifting module 5, the image formation unit 33. Specifically, in the plane of view of FIG. 8, the direction X toward the positive end thereof is the direction perpendicular to and away from the plane of view, the direction Y toward the positive end thereof is the upward direction, and the direction Z toward the positive end thereof is the leftward direction. The first axis Ax1 described above is an axis along the direction Z toward the positive end thereof, and the swing axis along the first axis Ax1 is called a first swing axis Rx1. The second axis Ax2 described above is an axis along the direction X toward the positive end thereof. Although not shown, an axis along the direction Y toward the positive end thereof is called a third axis. The third axis is an axis perpendicular to each of the first axis Ax1 and the second axis Ax2, and a swing axis along the third axis is called a second swing axis Rx2.

Configuration of Optical Path Changing Member

The optical path changing member 51 is a light transmissive substrate, such as a glass substrate. The optical path changing member 51 is disposed in the optical path between the light combiner 36 and the projection optics module 37, and the projection image light enters the optical path changing member 51 from the light combiner 36. The optical path changing member 51 is tilted by the operation of the actuators 55 and 56 with respect to an imaginary plane perpendicular to the light exiting optical axis of the light combiner 36 along which the projection image light exits to shift the optical path of the projection image light with the aid of refraction.

Configuration of First Movable Section

The first movable section 52 is formed in the shape of a rectangular frame and holds the optical path changing member 51. The first movable section 52 is supported by the second movable section 53 so as to be swingable around the first swing axis Rx1. The first movable section 52 includes a frame section 521, a shaft section 522, and a fixing section 523.

The frame section 521 surrounds the circumference of the optical path changing member 51 and supports the optical path changing member 51.

The shaft section 522 includes a shaft section 5221, which protrudes from an outer circumferential portion of the frame section 521 toward the positive end of the direction Z, and a shaft section 5222, which protrudes from an outer circumferential portion of the frame section 521 toward the negative end of the direction Z. The shaft sections 5221 and 5222 are inserted into the second movable section 53, so that the first movable section 52 is supported by the second movable section 53 so as to be swingable around the first swing axis Rx1. In detail, the extension of the center axis of the shaft section 5221 and the extension of the center axis of the shaft section 5222 coincide with each other, and the extensions of the center axes of the shaft sections 5221 and 5222 form the first swing axis Rx1 along the direction Z toward the positive end thereof.

The fixing section 523 includes a fixing section 5231, which protrudes from an outer circumferential portion of the frame section 521 toward the positive end of the direction Y, and a fixing section 5232, which protrudes from an outer circumferential portion of the frame section 521 toward the negative end of the direction Y. The first magnet 552 of the first actuator 55 is fixed to the tip of the fixing section 5231. The first magnet 556 of the first actuator 55 is fixed to the tip of the fixing section 5232.

The fixing sections 5231 and 5232 function as yokes for the first magnets 552 and 556, respectively.

Configuration of Second Movable Section

The second movable section 53 holds first coils 553 and 557 of the first actuator 55 in addition to the first movable section 52 so as to be swingable around the first swing axis Rx1. The second movable section 53 includes a frame section 531, an opening 532, a rotation support section 533, a support section 534, a shaft section 535, and a fixing section 536.

The frame section 531 is formed in the shape of a frame, and the opening 532 is provided at the center of the frame section 531 when viewed from the light exiting side. The frame section 531 has a pair of arms 5311 and 5312, which protrude toward the negative end of the direction Y.

The opening 532 passes through the frame section 531 along the direction X extending toward the positive end thereof, which is the direction in which the projection image light passes. The first movable section 52, which holds the optical path changing member 51, is disposed in the opening 532.

The rotation support section 533 includes a rotation support section 5331 provided at the inner edge facing the positive end of the direction Z out of the inner edges of the opening 532, and a rotation support section 5332, which is provided at the inner edge facing the negative end of the direction Z out of the inner edges of the opening 532. The rotation support section 5331 rotatably supports the shaft section 5221, and the rotation support section 5332 rotatably supports the shaft section 5222. The second movable section 53 thus supports the first movable section 52 so as to be swingable around the first swing axis Rx1.

The support section 534 includes a support section 5341 provided at the inner edge facing the positive end of the direction Y out of the inner edges of the opening 532, and a support section 5342, which is provided at the inner edge facing the negative end of the direction Y out of the inner edges of the opening 532. The support section 5341 supports the first coil 553 of the first actuator 55, and the support section 5342 supports the first coil 557 of the first actuator 55.

The shaft section 535 includes a shaft section 5351, which protrudes from an outer circumferential portion of the frame section 531 toward the positive end of the direction Y, and a shaft section 5352, which protrudes from an outer circumferential portion of the frame section 531 toward the negative end of the direction Y. The shaft sections 5351 and 5352 are inserted into the base 54, so that the second movable section 53 is supported by the base 54 so as to be swingable around the second swing axis Rx2. The extension of the center axis of the shaft section 5351 and the extension of the center axis of the shaft section 5352 coincide with each other, and the extensions of the center axes of the shaft sections 5351 and 5352 form the second swing axis Rx2.

The fixing section 536 is provided at an end portion facing the negative end of the direction Y out of the end portions of the frame section 531. In detail, the fixing section 536 is disposed in the frame section 531 at a position shifted from the first swing axis Rx1 toward the negative end of the direction Y. Furthermore, the fixing section 536 is disposed at a position shifted from the support section 5342 toward the negative end of the direction Y.

The fixing section 536 includes a fixing section 5361 provided at the arm 5311 facing the positive end of the direction Z out of the pair of arms 5311 and 5312, and a fixing section 5362 provided at the arm 5312 facing the negative end of the direction Z out of the pair of arms 5311 and 5312. The second magnet 562 of the second actuator 56 is fixed to the fixing section 5361. The second magnet 566 of the second actuator 56 is fixed to the fixing section 5362.

Note that the fixing sections 5361 and 5362 function as yokes for the second magnets 562 and 566, respectively.

Configuration of Base

The base 54 holds second coils 563 and 567 of the second actuator 56 in addition to the second movable section 53 so as to be swingable around the second swing axis Rx2. The base 54 is formed in the shape of a frame and has an opening 541, in which the second movable section 53 is disposed.

The base 54 has recesses 542 and 543 formed continuously with the inner edge of the opening 541 and recessed toward the negative end of the direction Y. The recesses 542 and 543 are provided symmetrically with respect to the second swing axis Rx2, with the recess 542 provided at a position shifted from the second swing axis Rx2 toward the positive end of the direction Z, the recess 543 provided at a position shifted from the second swing axis Rx2 toward the negative end of the direction Z.

The base 54 further includes a rotation support section 544 and a support section 545.

The rotation support section 544 includes a rotation support section 5441 provided at the inner edge facing the positive end of the direction Y out of the inner edges of the opening 541, and a rotation support section 5442, which is provided at the inner edge facing the negative end of the direction Y out of the inner edges of the opening 541. The rotation support section 5441 rotatably supports the shaft section 5351, and the rotation support section 5442 rotatably supports the shaft section 5352. The second movable section 53 is thus supported by the based 54 so as to be swingable around the second swing axis Rx2.

The support section 545 includes a support section 5451, which is provided at the inner edge facing the positive end of the direction Z out of the inner edges of the recess 542, and a support section 5452, which is provided at the inner edge facing the negative end of the direction Z out of the inner edges of the recess 543. The support section 5451 supports the second coil 563 of the second actuator 56, and the support section 5452 supports the second coil 567 of second actuator 56.

Configuration of First Actuator

The first actuator 55 swings the optical path changing member 51 around the first swing axis Rx1 by swinging the first movable section 52 around the first swing axis Rx1.

The first actuator 55 includes a first driver 551 and a second driver 555, which are disposed at positions on the second swing axis Rx2 and symmetrically with respect to the first swing axis Rx1. That is, the first driver 551 and the second driver 555 are disposed at positions that sandwich the first swing axis Rx1, and the first actuator 55 is disposed at a position on the second swing axis Rx2.

The first driver 551 is disposed at a position shifted from the first swing axis Rx1 toward the positive end of the direction Y, and the second driver 555 is disposed at a position shifted from the first swing axis Rx1 toward the negative end of the direction Y.

The first driver 551 is a voice coil motor including the first magnet 552 fixed to the first movable section 52 and the first coil 553 supported by the second movable section 53. That is, the first driver 551 is disposed between the first movable section 52 and the second movable section 53.

The second driver 555 is a voice coil motor including the first magnet 556 fixed to the first movable section 52 and the first coil 557 supported by the second movable section 53. That is, the second driver 555 is disposed between the first movable section 52 and the second movable section 53.

The controller 6, which will be described later, supplies the first coil 553 and the first coil 557 with alternating currents of opposite phases, so that the optical path changing member 51 held by the first movable section 52 swings around the first swing axis Rx1.

Configuration of Second Actuator

The second actuator 56 swings the optical path changing member 51 around the second swing axis Rx2 by swinging the second movable section 53.

The second actuator 56 includes a first driver 561 and a second driver 565, which are disposed at positions shifted from the first swing axis Rx1 toward the negative end of the direction Y and symmetrically with respect to the second swing axis Rx2. That is, the first driver 561 and the second driver 565 are disposed at positions that sandwich the second swing axis Rx2, and the second actuator 56 is disposed at a position at a position shifted from the first swing axis Rx1 toward the negative end of the direction Y. As described above, the direction Y toward the negative end thereof is the opposite direction of the direction in which the extension 425 of the heat diffuser 42 extends from the contact section 424, which is in contact with the panel body 411, in each of the panel modules 4B, 4G, and 4R.

The first driver 561 is disposed at a position shifted from the second swing axis Rx2 toward the positive end of the direction Z, and the second driver 565 is disposed at a position shifted from the second swing axis Rx2 toward the negative end of the direction Z.

The first driver 561 is a voice coil motor including the second magnet 562 fixed to second movable section 53 and the second coil 563 supported by the base 54. That is, the first driver 561 is disposed between the second movable section 53 and the base 54.

The second driver 565 is a voice coil motor including the second magnet 566 fixed to the first movable section 52 and the second coil 567 supported by the base 54. That is, the second driver 565 is disposed between the second movable section 53 and the base 54.

The controller 6, which will be described later, supplies the second coils 563 and 567 with the alternating currents of opposite phases, so that the second movable section 53 swings around the second swing axis Rx2 relative to the base 54, and the optical path changing member 51 therefore swings around the second swing axis Rx2.

Optical Path Shift Achieved by Optical Path Shifting Module

Figure 9:
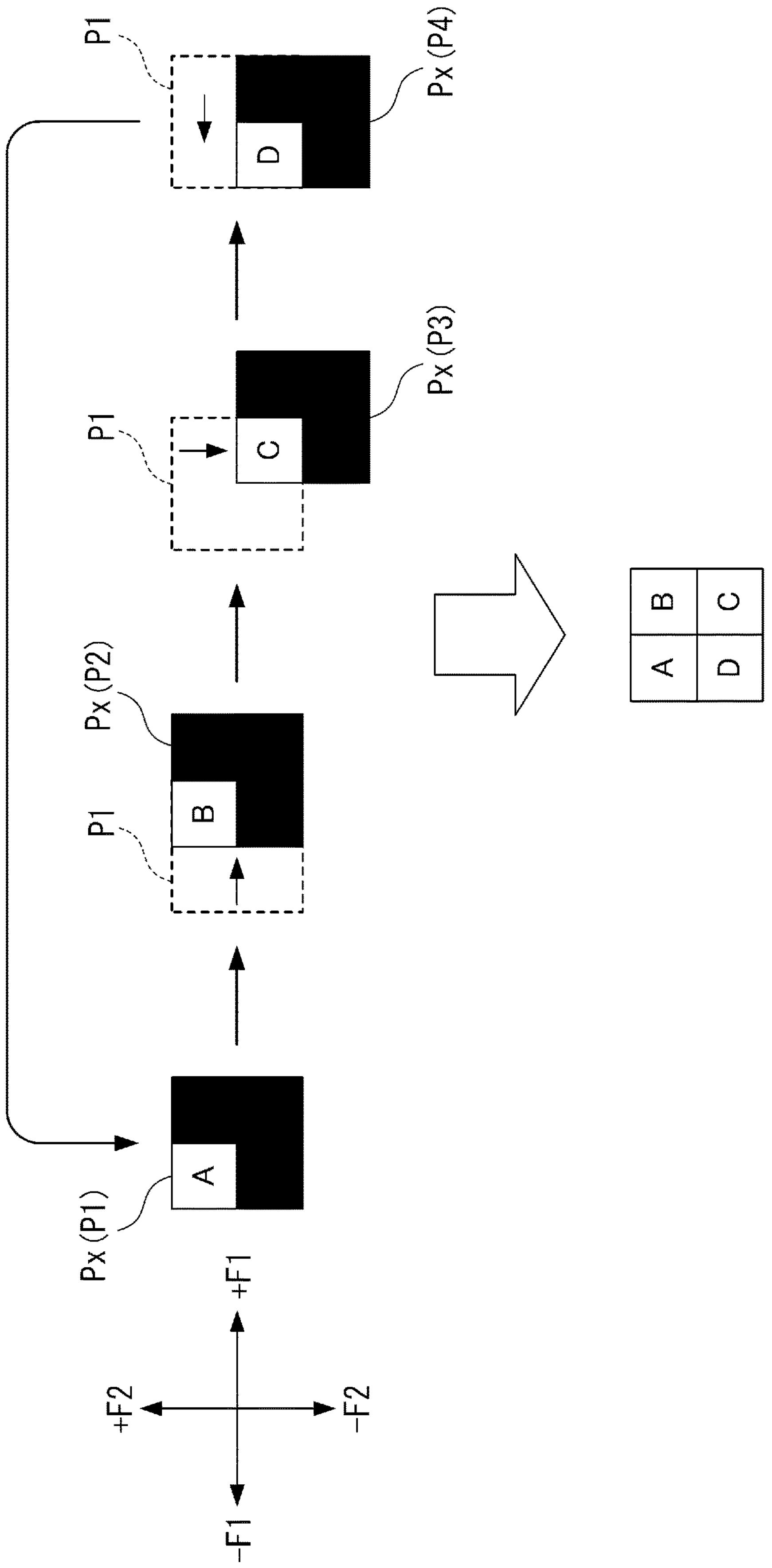
FIG. 9 describes an optical path shift of projection image light according to the first embodiment.

FIG. 9 describes the optical path shift of the projection image light achieved by the optical path shifting module 5.

The increase in the resolution of a projection image achieved by the optical path shifting module 5 will now be described.

As described above, the optical path shifting module 5 changes the posture of the optical path changing member 51, through which the projection image light PL passes, to shift the optical path of the projection image light PL by using refraction at the optical path changing member 51.

Note that a direction F1 toward the positive end thereof and a direction F2 toward the positive end thereof shown in FIG. 9 are directions perpendicular to each other at the projection receiving surface PS, that the direction F1 toward the negative end thereof is the opposite direction of the direction F1 toward the positive end thereof, and that the direction F2 toward the negative end thereof is the opposite direction of the direction F2 toward the positive end thereof. The direction F1 toward the positive end thereof corresponds to a first direction, and the direction F2 toward the negative end thereof corresponds to a second direction.

Specifically, the optical path shifting module 5 shifts the optical path of the projection image light toward the positive and negative ends of the direction F1 and toward the positive and negative ends of the direction F2, as shown in FIG. 9, by swinging the optical path changing member 51 in two directions, a first swing direction around the first swing axis Rx1 and a second swing direction around the second swing axis Rx2. Pixels Px of a projection image displayed on the projection receiving surface PS are thus displaced toward the positive and negative ends of the direction F1 and toward the positive and negative ends of the direction F2.

The controller 6, which will be described later, causes the optical path shifting module 5 to combine the shift of the optical path of the projection image light toward the positive and negative ends of the direction F1 and the shift of the optical path of the projection image light toward the positive and negative ends of the direction F2 with each other to increase the apparent number of pixels and in turn increase the resolution of the projection image.

For example, the controller 6 causes the optical path shifting module 5 to shift the optical path of the projection image light to move each of the pixels Px to a position displaced by half a pixel toward the positive and negative ends of the direction F1 and toward the positive and negative ends of the direction F2. The term "half a pixel" indicates a half size of each of the pixels Px.

The position where the image is displayed on the projection receiving surface PS is thus shifted to a second position P2 displaced by half a pixel from the first position P1 toward the positive end of the direction F1, to a third position P3 displaced by half a pixel from the second position P2 toward the negative end of the direction F2, and to a fourth position P4 displaced by half a pixel from the first position P1 toward the negative end of the direction F2. The second position P2, the third position P3, and the fourth position P4 correspond to positions shifted from the first position P1.

The controller 6 then causes the optical path shifting module 5 to shift the optical path of the projection image light in such a way that the pixel Px is displayed at each of the positions P1, P2, P3, and P4 for a predetermined period of time to change the contents displayed by the panel modules 4B, 4G, and 4R in synchronization with the optical path shift. Pixels A, B, C, and D each having a size smaller than the pixel Px can therefore be apparently displayed.

For example, to display the pixels A, B, C, and D as a whole at a frequency of 60 Hz, the contents displayed at the liquid crystal panels 41 need to be switched at the frequency four times higher than 60 Hz in correspondence with the positions P1, P2, P3, and P4. In this case, a projection image having apparently high resolution can be displayed by setting the refresh rate of each of the liquid crystal panels 41 to 240 Hz and causing each of the liquid crystal panels 41 to sequentially form projection image light containing the pixel A to be displayed at the first position P1, projection image light containing the pixel B to be displayed at the second position P2, projection image light containing the pixel C to be displayed at the third position P3, and projection image light containing the pixel D to be displayed at the fourth position P4.

In the example of the optical path shift shown in FIG. 9, the directions toward the positive and negative ends of the direction F1 and the directions toward the positive and negative ends of the direction F2 are the directions in which the pixels Px displayed in a matrix on the projection receiving surface PS are arranged. The directions toward the positive and negative ends of the direction F1 and the directions toward the positive and negative ends of the direction F2, however, may not be perpendicular to each other and may incline with respect to the direction in which the pixels Px are arranged. Even when the shift directions described above are employed, combining the optical path shift in the directions toward the positive and negative ends of the direction F1 and the optical path shift in the directions toward the positive and negative ends of the direction F2 with each other as appropriate allows movement of each of the pixels Px to the positions P1, P2, P3, and P4. The amount of displacement of each of the positions P2 to P4 from the first position P1 is not limited to half a pixel, and may, for example, be ¼ or ¾ of the pixel Px.

Figure 10:
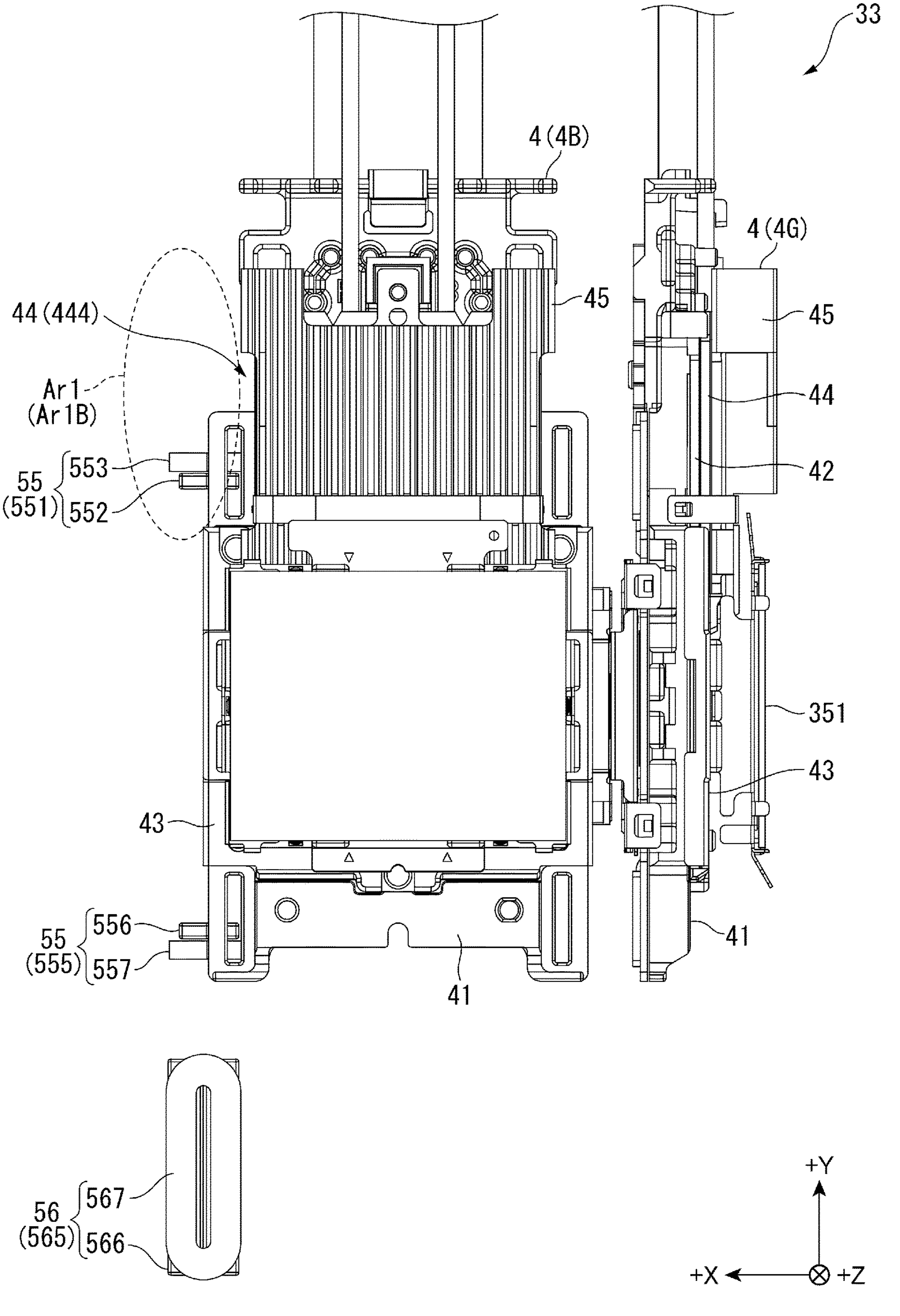
FIG. 10 shows the positional relationship between a portion of the panel modules and actuators according to the first embodiment.
Figure 11:
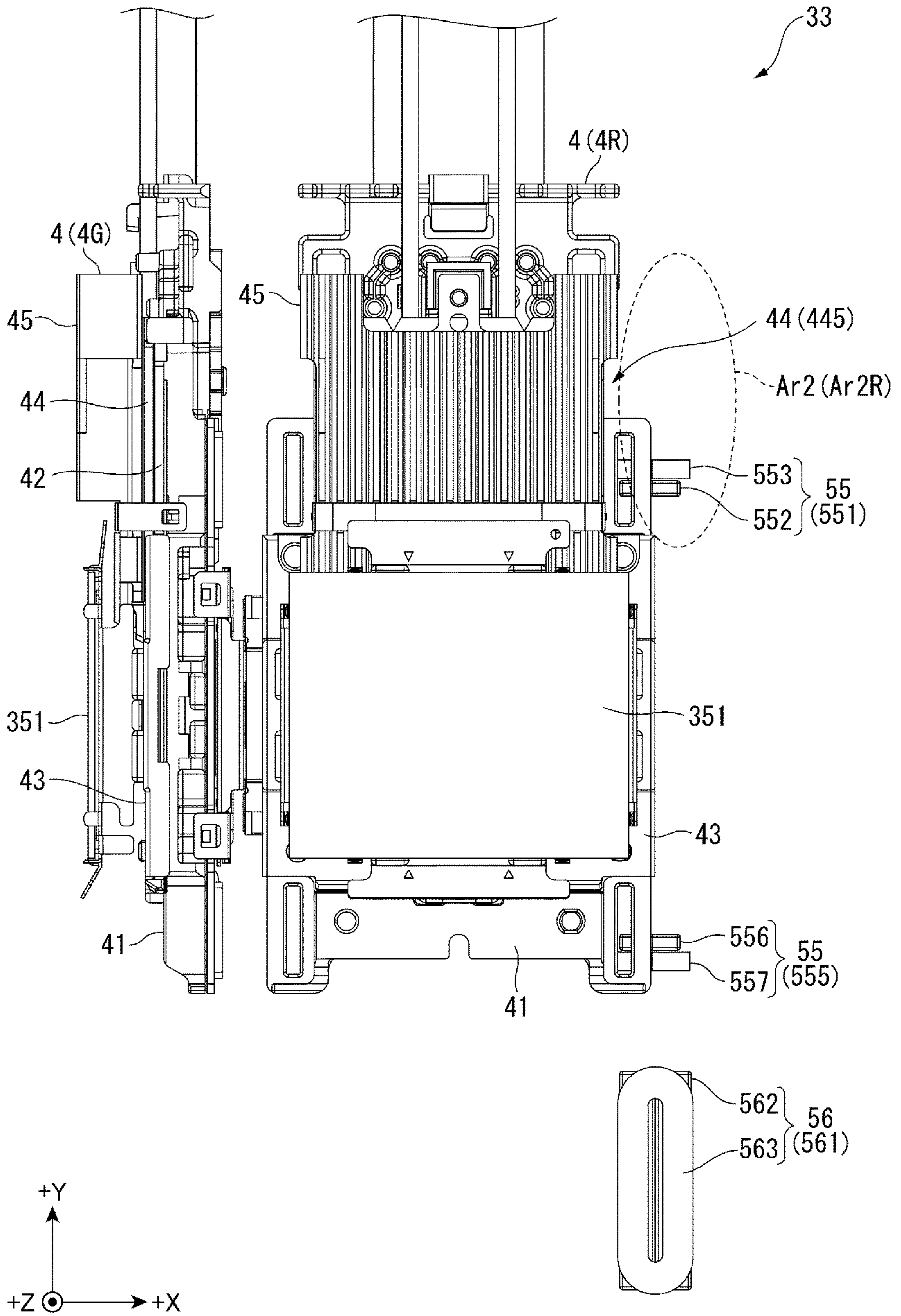
FIG. 11 shows positional relationship between another portion of the panel modules and the actuators according to the first embodiment.
Figure 12:
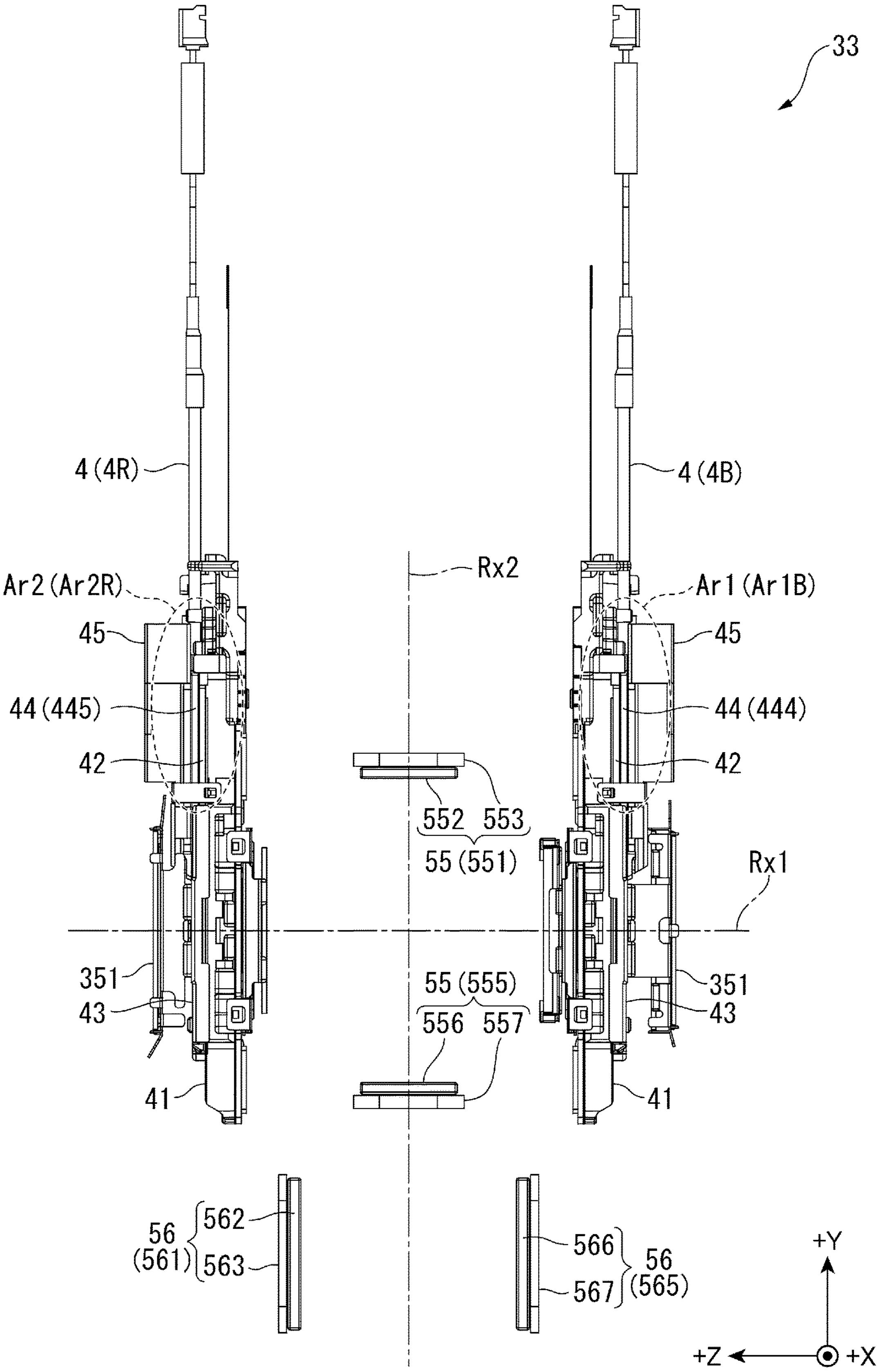
FIG. 12 shows the positional relationship between still another portion of the panel modules and the actuators according to the first embodiment.

Positional Relationship Between High-Temperature Region and Actuator in Image Formation Unit FIG. 10 shows the positional relationship of the panel modules 4B and 4G with the actuators 55 and 56 viewed from the blue light incident side. FIG. 11 shows the positional relationship of the panel modules 4R and 4G with the actuators 55 and 56 viewed from the red light incident side. FIG. 12 shows the positional relationship of the panel modules 4B and 4R with the actuators 55 and 56 viewed from the light exiting side of the optical path shifting module 5. In other words, FIGS. 10 to 12 show the positional relationship of the regions Ar1 and Ar2 described above with the actuators 55 and 56. Note that FIGS. 10 to 12 show the direction X toward the positive end thereof, the direction Y toward the positive end thereof, and the direction z toward the positive end thereof in the panel module 4B for blue.

During the operation of each of the panel modules 4, the temperatures of the regions Ar1 and Ar2 in the vicinity of the side ends 444 and 445 of the thermoelectric conversion device 44 outside the panel modules 4 tend to rise, as described above. On the other hand, when the temperature of any of the magnets rises, a phenomenon called demagnetization, which reduces the magnetic force of the magnet, occurs.

Therefore, to operate the first actuator 55 and the second actuator 56 in a stable manner, the first magnets 552 and 556 and the second magnets 562 and 566 need to be separate from the regions Ar1 and Ar2. Hereinafter, the region Ar1 in the vicinity of the side end 444 of the thermoelectric conversion device 44 provided in the panel module 4B for blue is referred to as a region Ar1B, and the region Ar2 in the vicinity of the side end 445 of the thermoelectric conversion device 44 provided in the panel module 4R for red is referred to as a region Ar2R. As described above, the side end 444 of the thermoelectric conversion device 44 of the panel module 4B for blue is the end facing the optical path shifting module 5 of the thermoelectric conversion device 44 out of the ends of the panel module 4B for blue. The side end 444 of the thermoelectric conversion device 44 of the panel module 4R for red is the end facing the optical path shifting module 5 out of the ends of the thermoelectric conversion device 44 of the panel module 4R for red.

In the present embodiment, the magnets 552, 556, 562, and 566 are disposed at positions separate from the regions Ar1B and Ar2R described above, as shown in FIGS. 10 to 12.

Specifically, the first magnet 556 and the second magnets 562 and 6 are disposed at positions displaced from the region Ar1B toward the negative end of the direction Y, as shown in FIGS. 10 and 12. As described above, the direction Y toward the negative end thereof is the opposite direction of the direction Y toward the positive end thereof, in which the extension 425 extends from the contact section 424 in each of the panel modules 4B, 4G, and 4R.

Furthermore, the first magnet 556 and the second magnets 562 and 566 are disposed at positions displaced from the region Ar1B toward the panel module 4R for red, as shown in FIG. 12.

Similarly, the first magnet 556 and the second magnets 562 and 566 are disposed at positions displaced from the region Ar2R toward the negative end of the direction Y, as shown in FIGS. 11 and 12. Furthermore, the first magnet 556 and the second magnets 562 and 566 are disposed at positions displaced from the region Ar2R toward the panel module 4B for blue, as shown in FIG. 12.

On the other hand, the position of the first magnet 552 in the direction toward the positive end of the direction Y substantially coincides with the position of the region Ar1B in the direction toward the positive end of the direction Y and the position of the region Ar2R in the direction toward the positive end of the direction Y, as shown in FIGS. 10 and 11.

The first magnet 552 is however disposed at a position displaced from the region Ar1B toward the panel module 4R for red and further displaced from the region Ar2R toward the panel module 4B for blue, as shown in FIG. 12.

The fact that the magnets 552, 556, 562, and 566 are disposed at the positions separate from the regions Ar1B and Ar2R allows suppression of the thermal effect of the panel modules 4B and 4R on the magnets 552, 556, 562, and 566.

Note that the panel module 4G for green is provided at the side opposite from the optical path shifting module 5 with the light combiner 36 interposed therebetween, as shown in FIG. 1. The thermal effect of the panel module 4G for green on the magnets 552, 556, 562, and 566 is therefore suppressed.

The occurrence of the demagnetization of the magnets 552, 556, 562, and 566 can therefore be suppressed, which suppresses hindered operation of the optical path shifting module 5 due to the heat.

Configuration of Controller

FIG. 13 is a block diagram showing the configuration of the controller 6.

The controller 6 controls the operation of the projector 1. For example, the controller 6 controls the operation of each of the panel modules 4 and the optical path shifting module 5 in accordance with the temperatures of the liquid crystal panels 41 of the panel modules 4B, 4G, and 4R and the temperatures of the actuators 55 and 56.

The controller 6 includes an actuator temperature sensor 61, a panel temperature sensor 62, a storage section 63, and a control section 64, as shown in FIG. 13.

In the following description, the liquid crystal panel 41 and the thermoelectric conversion device 44 of the panel module 4B for blue are called a liquid crystal panel 41B for blue and a thermoelectric conversion device 44B for blue, as shown in FIG. 13. The liquid crystal panel 41 and the thermoelectric conversion device 44 of the panel module 4G for green are called a liquid crystal panel 41G for green and a thermoelectric conversion device 44G for green. The liquid crystal panel 41 and the thermoelectric conversion device 44 of the panel module 4R for red are called a liquid crystal panel 41R for red and a thermoelectric conversion device 44R for red.

Configuration of Actuator Temperature Sensor

The actuator temperature sensor 61 detects the temperature of each of the actuators 55 and 56. The actuator temperature sensor 61 includes a first temperature sensor 611, a second temperature sensor 612, a third temperature sensor 613, and a fourth temperature sensor 614.

The first temperature sensor 611 detects the temperature of the first magnet 552.

The second temperature sensor 612 detects the temperature of the first magnet 556.

The third temperature sensor 613 detects the temperature of the second magnet 562.

The fourth temperature sensor 614 detects the temperature of the second magnet 566.

The temperature sensors 611, 612, 613, and 614 each output the detected temperature to the control section 64.

Configuration of Panel Temperature Sensor

The panel temperature sensor 62 detects the temperatures of the liquid crystal panels 41. The panel temperature sensor 62 includes a temperature sensor 62B for blue, a temperature sensor 62G for green, and a temperature sensor 62R for red.

The temperature sensor 62B for blue detects the temperature of the liquid crystal panel 41B for blue. The temperature sensor 62G for green detects the temperature of the liquid crystal panel 41G for green.

The temperature sensor 62R for red detects the temperature of the liquid crystal panel 41R for red.

The temperature sensors 62B, 62G, and 62R each output the detected temperature to the control section 64.

Configuration of Storage Section

The storage section 63 is formed of a storage, such as a nonvolatile memory, and stores programs and data necessary for controlling the projector 1. For example, the storage section 63 stores a control program that causes the control section 64 to carry out a control process, which will be described later. The storage section 63 further stores, for example, a variety of thresholds necessary for the control process.

Schematic Configuration of Control Section

The control section 64 refers to the storage section 63 and controls the operation of each configuration of the projector 1. The control section 64 includes a thermoelectric conversion device control section 65, a panel control section 66, and a shift control section 67.

Configuration of Thermoelectric Conversion Device Control Section

The thermoelectric conversion device control section 65 controls the thermoelectric conversion devices 44 based on the temperatures detected by the actuator temperature sensor 61 and the panel temperature sensor 62.

For example, when the temperature of the liquid crystal panel 41B for blue is higher than the upper limit of an appropriate temperature range, the thermoelectric conversion device control section 65 causes the thermoelectric conversion device 44B for blue to absorb heat from the liquid crystal panel 41B for blue. For example, when the temperature of the liquid crystal panel 41B for blue is lower than the lower limit of the appropriate temperature range, the thermoelectric conversion device control section 65 causes the thermoelectric conversion device 44B for blue to heat the liquid crystal panel 41B for blue. The thermoelectric conversion device control section 65 causes the thermoelectric conversion device 44G for green and the thermoelectric conversion device 44R for red to perform the heat absorption control and the heating control in the same manner.

Furthermore, for example, when the temperature of at least one of the magnets 552, 556, 562, and 566 is higher than a first threshold, the thermoelectric conversion device control section 65 reduces the outputs of the thermoelectric conversion devices 44B, 44G, and 44R. That is, when the temperature of at least one of the first actuator 55 and the second actuator 56 detected by the actuator temperature 61 sensor is higher than a predetermined value, the thermoelectric conversion device control section 65 reduces the outputs of the thermoelectric conversion devices 44B, 44G, and 44R. In this case, the thermoelectric conversion device control section 65 reduces the outputs of the thermoelectric conversion devices 44B, 44G, and 44R when the temperature of the at least one magnet is higher than the first threshold in either of the following cases: a case where the thermoelectric conversion devices 44B, 44G, and 44R absorb heat from the respective liquid crystal panels; and a case where the thermoelectric conversion devices 44B, 44G, and 44R heat the respective liquid crystal panels.

Note that the panel module 4G does not thermally affect the magnet 552, 556, 562, or 566, unlike the case described above. The thermoelectric conversion device control section 65 may therefore not reduce the output of the thermoelectric conversion device 44G for green even when reducing the outputs of the thermoelectric conversion devices 44B and 44R.

Configuration of Panel Control Section

The panel control section 66 controls the operation of each of the liquid crystal panels 41B, 41G, and 41R based on the temperatures detected by the panel temperature sensor 62.

Specifically, when the temperature of each of the liquid crystal panels 41B, 41G, and 41R is higher than or equal to a second threshold, the panel control section 66 operates each of the liquid crystal panels 41B, 41G, and 41R in a high resolution mode. On the other hand, when the temperature of at least one of the liquid crystal panels 41 out of the liquid crystal panels 41 B, 41G, and 41R is lower than the second threshold, the panel control section 66 operates each of the liquid crystal panels 41B, 41G, and 41R in a low resolution mode. The second threshold can, for example, be the lower limit of the appropriate temperature range described above.

Figure 14:
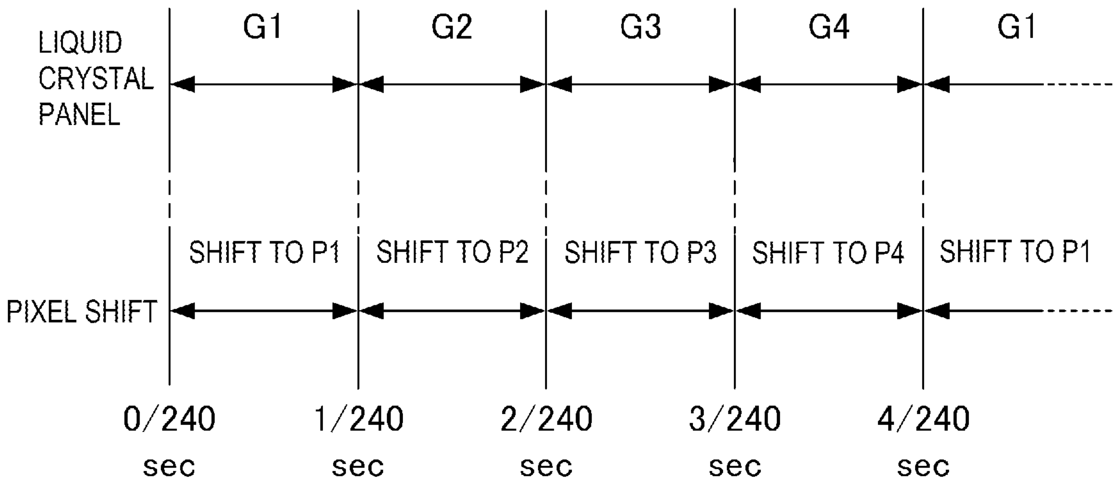
FIG. 14 describes the operation of a liquid crystal panel and the optical path shifting module in a high resolution mode according to the first embodiment.

FIG. 14 describes the operation of one of the liquid crystal panels 41 and the optical path shifting module 5 in the high resolution mode.

In the high resolution mode, the panel control section 66 performs first panel control.

In the first panel control, the panel control section 66 drives the liquid crystal panels 41B, 41G, and 41R at a first refresh rate to sequentially form projection image light G1, which displays the pixel Px described above at the first position P1, projection image light G2, which displays the pixel Px at the second position P2, projection image light G3, which displays the pixel Px at the third position P3, and projection image light G4, which displays the pixel Px at the fourth position P4.

Specifically, in the first panel control, the panel control section 66 drives the liquid crystal panels 41B, 41G, and 41R at 240 Hz to sequentially form the projection image light G1, G2, G3, and G4, as shown in FIG. 14. That is, in the high resolution mode, the panel control section 66 sequentially forms the projection image light G1, G2, G3, and G4 every 1/240 seconds.

Figure 15:
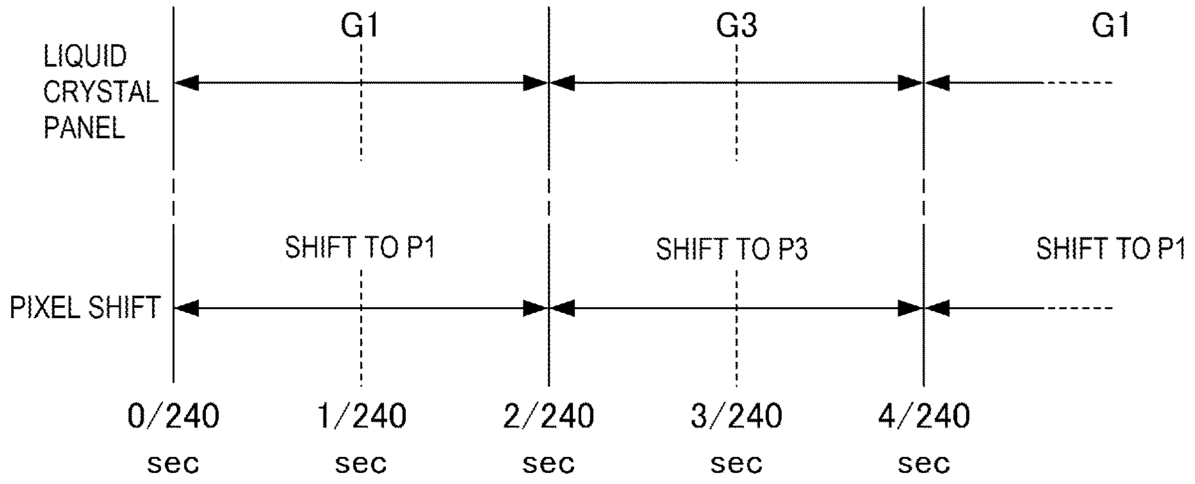
FIG. 15 describes the operation of the liquid crystal panel and the optical path shifting module in a low resolution mode according to the first embodiment.

FIG. 15 describes the operation of one of the liquid crystal panels 41 and the optical path shifting module 5 in the low resolution mode.

In the low resolution mode, the panel control section 66 performs second panel control.

In the second panel control, the panel control section 66 drives the liquid crystal panels 41B, 41G, and 41R at a second refresh rate lower than the first refresh rate to sequentially form the projection image light G1 and one of the projection image light G2, the projection image light G3, and the projection image light G4.

Specifically, in the second panel control, the panel control section 66 drives the liquid crystal panels 41B, 41G, and 41R at 120 Hz, which is lower than 240 Hz, to sequentially form the projection image light G1 and the projection image light G3, as shown in FIG. 15. That is, in the second panel control, the panel control section 66 sequentially forms the projection image light G1 and the projection image light G3 every 1/120 seconds.

When the temperature of any of the liquid crystal panels 41 is low, the responsiveness of the liquid crystal material decreases, making it difficult for the liquid crystal panel 41 to form images at a high refresh rate.

In contrast, when the temperature of any of the liquid crystal panels 41 is low, the panel control section 66 switches the panel control from the first panel control to the second panel control to switch the refresh rate of the liquid crystal panels 41 from 240 Hz to 120 Hz, so that the projection image light G1 and the projection image light G3 can be formed without any delay.

Configuration of Shift Control Section

The shift control section 67 controls the operation of each of the actuators 55 and 56 of the optical path shifting module 5 based on the temperatures detected by the panel temperature sensor 62.

Specifically, when the temperature of each of the liquid crystal panels 41B, 41G, and 41R is higher than or equal to the second threshold, the shift control section 67 operates each of the actuators 55 and 56 in the high resolution mode. On the other hand, when the temperature of at least one of the liquid crystal panels 41 out of the liquid crystal panels 41B, 41G, and 41R is lower than the second threshold, the shift control section 67 operates each of the actuators 55 and 56 in the low resolution mode.

In the high resolution mode, the shift control section 67 performs first shift control.

In the first shift control, the shift control section 67 operates each of the actuators 55 and 56 to switch the projection image light display position at a frequency according to the first refresh rate.

Specifically, in the first shift control, the shift control section 67 operates the optical path shifting module 5 at 240 Hz to sequentially switch the projection image light display position to the positions P1, P2, P3, and P4, as shown in FIG. 14. That is, in the first shift control, the shift control section 67 operates the optical path shifting module 5 to sequentially switch display of the projection image light among display of the projection image light G1 at the first position P1, display of the projection image light G2 at the second position P2, display of the projection image light G3 at the third position P3, and display of the projection image light G4 at the fourth position P4 every 1/240 second. In detail, in the first shift control, the shift control section 67 operates the optical path shifting module 5 to display the projection image light G1 at the first position P1 at the timing when the projection image light G1 is formed, display the projection image light G2 at the second position P2 at the timing when the projection image light G2 is formed, display the projection image light G3 at the third position P3 at the timing when the projection image light G3 is formed, and display the projection image light G4 at the fourth position P4 at the timing when the projection image light G4 is formed.

In the low resolution mode, the shift control section 67 performs second shift control.

In the second shift control, the shift control section 67 operates the optical path shifting module 5 at a frequency lower than the frequency at which the optical path shifting module 5 is operated under the first shift control to display the projected image light formed by each of the liquid crystal panels 41 at a position according to the projected image light.

Specifically, in the second shift control, the shift control section 67 operates the optical path shifting module 5 at 120 Hz to sequentially switch the display of the projection image light between the display of the projection image light G1 at the first position P1 and the display of the projection image light G3 at the third position P3, as shown in FIG. 15. That is, in the second shift control, the shift control section 67 sequentially switches the display of the projection image light between the display of the projection image light G1 at the first position P1 and the display of the projection image light G3 at the third position P3 every 1/120 second. In detail, in the second shift control, the shift control section 67 operates the optical path shifting module 5 to display the projection image light G1 at the first position P1 at the timing when the projection image light G1 is formed, and the projection image light G3 at the third position P3 at the timing when the projection image light G3 is formed.

Operating the optical path shifting module 5 as described above allows an increase in the apparent resolution of a projection image displayed on the projection receiving surface PS when the projection image light is projected thereon. In addition to the above, even when the temperature of any of the liquid crystal panels 41 is low, the resolution of an image displayed on the projection receiving surface PS when the projection image light is projected thereon can be increased as compared with a case where the optical path shifting module 5 does not operate.

Control Process

Figure 16:
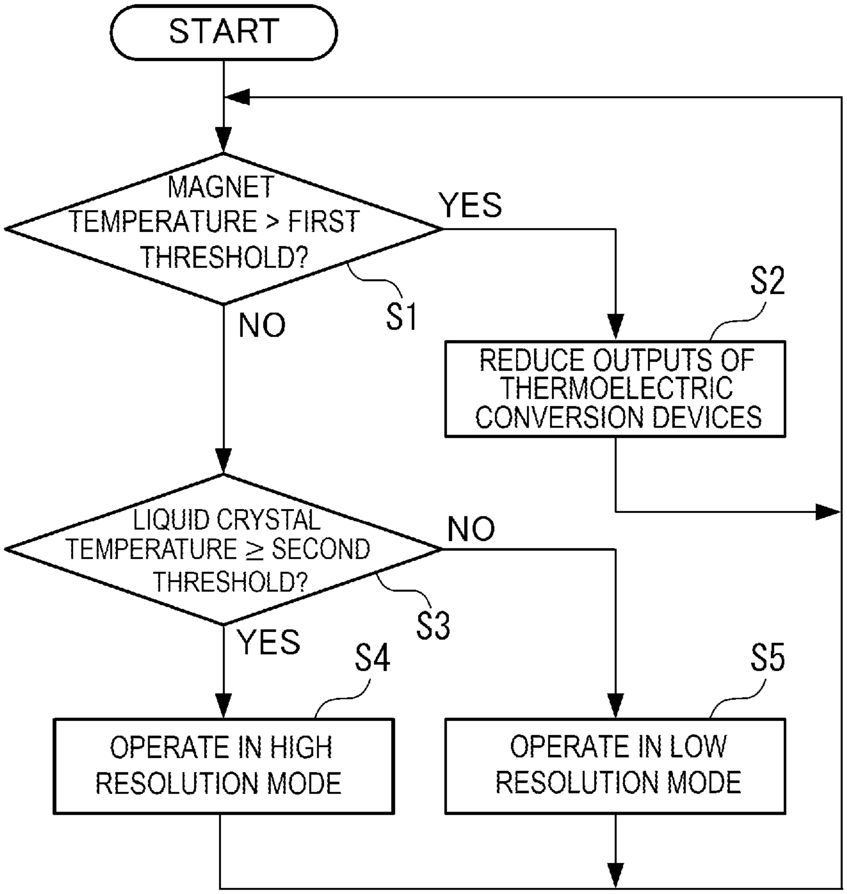
FIG. 16 is a flowchart showing a control process according to the first embodiment.

FIG. 16 is a flowchart showing the control process carried out by the control section 64.

The control section 64 reads the control program stored in the storage section 63 and carries out the control process shown in FIG. 16.

In the control process, the control section 64 first evaluates whether the temperature of each of the actuators 55 and 56 detected by the actuator temperature sensor 61 is higher than the first threshold (step S1). Specifically, in step S1, the control section 64 evaluates whether the temperature of each of the magnets 552, 556, 562, and 566 is higher than the first threshold.

When the control section 64 determines that the temperature of at least one of the magnets described above is higher than the first threshold in the evaluation process in step S1 (YES in step S1), the thermoelectric conversion device control section 65 reduces the outputs of the thermoelectric conversion devices 44B, 44G and 44R (step S2).

In step S2, the thermoelectric conversion device control section 65 reduces the outputs of the thermoelectric conversion devices 44B, 44G, and 44R in either of the following cases: the where case the thermoelectric conversion devices 44B, 44G, and 44R absorb heat from the respective liquid crystal panels 41B, 41G, and 41R; and the case where the thermoelectric conversion devices 44B, 44G, and 44R heat the respective liquid crystal panels 41B, 41G, and 41R, as described above.

Thus configured step S2 can suppress increases in the temperatures of the magnets 552, 556, 562, and 566, and therefore suppress the demagnetization of the magnets 552, 556, 562, and 566.

Since the thermoelectric conversion device 44G for green does not thermally affect the optical path shifting module 5 as described above, the thermoelectric conversion device control section 65 may not reduce in step S2 the output of the thermoelectric conversion device 44G for green.

After step S2, the control section 64 returns to the process in step S1.

When the control section 64 determines in the evaluation process in step S1 that the temperature of each of the magnets 552, 556, 562, and 566 is not higher than the first threshold (NO in step S1), the control section 64 evaluates whether the temperature of each of the liquid crystal panels 41B, 41G, and 41R detected by the panel temperature sensor 62 is higher than or equal to the second threshold (step S3).

When the control section 64 determines in the evaluation process in step S3 that the temperature of each of the liquid crystal panels 41B, 41G, and 41R is higher than or equal to the second threshold (YES in step S3), the panel control section 66 operates the liquid crystal panels 41B, 41G, and 41R in the high resolution mode, and the shift control section 67 operates the optical path shifting module 5 in the high resolution mode (step S4). After step S4, the control section 64 returns to the process in step S1.

In the evaluation process in step S3, when the control section 64 determines that the temperature of at least one of the liquid crystal panels 41 out of the liquid crystal panels 41B, 41G, and 41R is lower than the second threshold (NO in step S3), the panel control section 66 operates the liquid crystal panels 41B, 41G, and 41R in the low resolution mode, and the shift control section 67 operates the optical path shifting module 5 in the low resolution mode (step S5). After step S5, the control section 64 returns to the process in step S1.

As described above, the configuration in which the control section 64 controls the operation of the liquid crystal panels 41B, 41G, and 41R, the thermoelectric conversion devices 44B, 44G, and 44R, and the optical path shifting module 5 allows projection of the apparently-high-resolution projection image light PL, and further allows projection of the apparently-high-resolution projection image light PL as compared with the case where the optical path shifting module 5 does not operate even when the responsiveness of the liquid crystal material is low.

Effects of First Embodiment

The projector 1 according to the present embodiment described above provides the effects below.

The projector 1 includes the panel module 4B for blue, the panel module 4G for green, the panel module 4R for red, the light combiner 36, the projection optics module 37, and the optical path shifting module 5.

The panel module 4B for blue, the optical axis of which is the first axis Ax1, outputs the blue image light that is modulated blue light. The panel module 4G for green, the optical axis of which is the second axis Ax2 perpendicular to the first axis Ax1, outputs the green image light that is modulated green light. The panel module 4R for red, the optical axis of which is the first axis Ax1, outputs the red image light that is modulated red light.

For example, the blue light corresponds to the first light, the green light corresponds to the second light, and the red light corresponds to the third light. The blue image light corresponds to the first image light, the green image light corresponds to the second image light, and the red image light corresponds to the third image light.

The light combiner 36 has the blue light incident surface 36B, the green light incident surface 36G, the red light incident surface 36R, and the light exiting surface 36S.

The blue image light is incident on the blue light incident surface 36B. The green image light is incident on the green light incident surface 36G. The red image light is incident on the red light incident surface 36R. The light exiting surface 36S, the optical axis of which is the second axis Ax2, allows the projection image light, which is combined light that is the combination of the blue image light, the green image light, and the red image light, to exit along the second axis Ax2.

The blue light incident surface 36B corresponds to a first light incident surface, the green light incident surface 36G corresponds to a second light incident surface, and the red light incident surface 36R corresponds to a third light incident surface.

The projection optics module 37 projects the projection image light output from the light combiner 36.

The optical path shifting module 5 shifts the optical path of projection image light that is output from the light combiner 36 and enters the projection optics module 37. The optical path shifting module 5 includes the optical path changing member 51, the first actuator 55, and the second actuator 56.

The optical path changing member 51 is disposed in the optical path between the light combiner 36 and the projection optics module 37.

The first actuator 55 includes the first driver 551 including the first magnet 552 and the first coil 553, and the second driver 555 including the first magnet 556 and the first coil 557. The first actuator 55 swings the optical path changing member 51 around the first swing axis Rx1 along the first axis Ax1.

The second actuator 56 includes the first driver 561 including the second magnet 562 and the second coil 563, and the second driver 565 including the second magnet 566 and the second coil 567. The second actuator 56 swings the optical path changing member 51 around the second swing axis Rx2 along the third axis perpendicular to each of the first axis Ax1 and the second axis Ax2. Note that the third axis is an axis along the direction Y toward the positive end thereof.

The panel module 4B for blue includes the liquid crystal panel 41B for blue, the heat diffuser 42, the thermoelectric conversion device 44B for blue, and the cooler 45.

The liquid crystal panel 41B for blue outputs the blue image light.

The heat diffuser 42 of the panel module 4B for blue extends from the liquid crystal panel 41B for blue along the third axis. The heat diffuser 42 transfers heat to and from the liquid crystal panel 41B for blue, and diffuses the received heat therein.

The thermoelectric conversion device 44B for blue transfers heat to and from the heat diffuser 42 of the panel module 4B for blue.

The cooler 45 of the panel module 4B for blue and the heat diffuser 42 sandwich the thermoelectric conversion device 44B for blue, and the cooler 45 transfers the heat to and from the thermoelectric conversion device 44B for blue.

The first actuator 55 and the second actuator 56 are each disposed at a position separate from the side end 444, which faces the positive end of the direction X, of the thermoelectric conversion device 44B for blue. That is, the magnets 552, 556, 562, and 566 of the actuators 55 and 56 are disposed at positions separate from the region Ar1B.

According to the configuration described above, when the surface in contact with the heat diffuser 42, out of the surfaces of the thermoelectric conversion device 44B for blue, serves as a heat generating surface, the heat generated by the thermoelectric conversion device 44B for blue is transferred to the heat diffuser 42, then diffused in the heat diffuser 42, and transferred to the liquid crystal panel 41B for blue. Therefore, when the temperature of the liquid crystal panel 41B for blue is low, the liquid crystal panel 41B for blue can be heated.

On the other hand, the heat generated in the liquid crystal panel 41B for blue is dissipated to the heat diffuser 42 and then diffused in the heat diffuser 42. In this process, the thermoelectric conversion device 44B for blue absorbs the heat of the heat diffuser 42 and dissipates the absorbed heat to the cooler 45, so that the heat generated in the liquid crystal panel 41B for blue can be quickly dissipated to the cooler 45. Therefore, when the temperature of the liquid crystal panel 41B for blue is high, the liquid crystal panel 41B for blue can be cooled.

As described above, using the thermoelectric conversion device 44B for blue allows adjustment of the temperature of the liquid crystal panel 41B for blue to an appropriate temperature in a short period, so that the responsiveness of the liquid crystal panel 41B for blue can be maintained in a satisfactory state in the short period. Therefore, swinging the optical path changing member 51 around each of the first swing axis Rx1 and the second swing axis Rx2 allows the high-speed pixel shift performed by the optical path shifting module 5, which shifts the positions of the plurality of pixels contained in the projection image light.

Furthermore, even when the thermoelectric conversion device 44B for blue generates a relatively large amount of heat, the first actuator 55 and the second actuator 56 are disposed at positions separate from the side end 444, which faces the optical path shifting module 5, of the thermoelectric conversion device 44B for blue. The effect of the heat conveyed by the thermoelectric conversion device 44B for blue on the magnets 552, 556, 562, and 566 of the actuators 55 and 56 can therefore be suppressed. Deterioration of the performance of each of the actuators 55 and 56 due to the heat can therefore be suppressed.

Since the responsiveness of the liquid crystal material of the liquid crystal panel 41B for blue and the operational performance of the actuators 55 and 56 provided in the optical path shifting module 5 can thus be maintained in a satisfactory state, an image having good image quality and high pseudo-resolution can be projected.

In the projector 1, the panel module 4R for red corresponds to the third panel module. The panel module 4R for red includes the liquid crystal panel 41R for red, the heat diffuser 42, the thermoelectric conversion device 44R for red, and the cooler 45.

The liquid crystal panel 41R for red outputs the red image light, which is the third image light. The liquid crystal panel 41R for red corresponds to the liquid crystal panel for third light.

The heat diffuser 42 of the panel module 4R for red extends from the liquid crystal panel 41R for red along the third axis, transfers heat to and from the liquid crystal panel 41R for red, and diffuses the received heat therein.

The thermoelectric conversion device 44R for red transfers heat to and from the heat diffuser 42 of the panel module 4R for red.

The cooler 45 of the panel module 4R for red and the heat diffuser 42 of the panel module 4R for red sandwich the thermoelectric conversion device 44R for red, and the cooler 45 transfers heat to and from the thermoelectric conversion device 44R for red.

The first actuator 55 and the second actuator 56 are each disposed at a position separate from the side end 445, which faces the optical path shifting module 5, of the thermoelectric conversion device 44R for red. That is, the magnets 552, 556, 562, and 566 of the actuators 55 and 56 are disposed at positions separate from the region Ar2R.

According to the configuration described above, the effect of the heat conveyed by the thermoelectric conversion device 44R for red on the first actuator 55 and the second actuator 56 can be suppressed, as in the case of the thermoelectric conversion device 44B for blue. Deterioration of the performance of the actuators 55 and 56 due to the heat conveyed by the thermoelectric conversion device 44R for red can therefore be suppressed.

In the projector 1, the first actuator 55 is disposed on the second swing axis Rx2.

The second swing axis Rx2 is a swing axis along the third axis perpendicular to each of the first axis Ax1 and the second axis Ax2, as described above. The first actuator 55 is therefore disposed at a position separate from the panel module 4B for blue and the panel module 4R for red. The effect of heat from the thermoelectric conversion device 44B for blue and the thermoelectric conversion device 44R for red on the actuators 55 and 56 can therefore be suppressed.

In the projector 1, the optical path shifting module 5 includes the first movable section 52, the second movable section 53, and the base 54.

The first movable section 52 holds the optical path changing member 51.

The second movable section 53 holds the first movable section 52 so as to be swingable around the first swing axis Rx1.

The base 54 holds the second movable section 53 so as to be swingable around the second swing axis Rx2.

The first actuator 55 includes the first driver 551 and the second driver 555 disposed on the second swing axis Rx2 and between the first movable section 52 and the second movable section 53 when viewed from the light exiting side of the optical path shifting module 5. The first actuator 55 swings the first movable section 52 around the first swing axis Rx1.

The second actuator 56 includes the first driver 561 and the second driver 565 disposed between the second movable section 53 and the base 54 and in the direction Y toward the negative end thereof with respect to the first swing axis Rx1 when viewed from the light exiting side of the optical path shifting module 5. The second actuator 56 swings the second movable section 53 around the second swing axis Rx2.

According to the configuration described above, the first actuator 55 and the second actuator 56 disposed as described above can swing the optical path changing member 51 around the first swing axis Rx1 and the second swing axis Rx2, respectively. The plurality of pixels contained in the projection image light can therefore be shifted to a plurality of positions.

The actuators 55 and 56 can be disposed at positions separate from the regions Ar1B and Ar2R. Deterioration of the performance of each of the actuators 55 and 56 due to the heat can therefore be suppressed.

The projector 1 includes the panel temperature sensor 62, which detects the temperature of the liquid crystal panel 41B for blue, and the shift control section 67, which controls the optical path shifting module 5.

When the temperature of the liquid crystal panel 41B for blue detected by the panel temperature sensor 62 is lower than the second threshold, the shift control section 67 switches the shift control from the first shift control, in which the position of each of the pixels Px contained in the projection image light output from the light combiner 36 is sequentially shifted from the first position P1 to the positions P2, P3, and P4, which are a plurality of shift positions to which the pixel Px is shifted, to the second shift control, in which the position of the pixel Px is sequentially shifted to the first position P1 and the third position P3.

In this process, when the temperature of the liquid crystal panel 41B for blue is low, the responsiveness of the liquid crystal panel 41B for blue decreases, so that the liquid crystal panel 41B for blue cannot form images at a high refresh rate.

In contrast, when the temperature of the liquid crystal panel 41B for blue is low so that the responsiveness of the liquid crystal panel 41B for blue is low, the shift control section 67 switches the shift control from the first shift control to the second shift control. Switching the pixel shift around the two axes, the first swing axis Rx1 and the second swing axis Rx2, to the pseudo-single-axis shift as described above allows suppression of deterioration of image quality of images formed by the liquid crystal panel 41B for blue even at the low refresh rate.

On the other hand, when the temperature of the liquid crystal panel 41B for blue reaches an appropriate temperature, the shift control can be switched from the second shift control back to the first shift control. The liquid crystal panel 41B for blue and the optical path shifting module 5 can therefore be operated with suppression of the deterioration of the image quality in accordance with the temperature of the liquid crystal panel 41B for blue.

The projector 1 includes the panel control section 66, which controls the liquid crystal panel 41B for blue.

When the temperature of the liquid crystal panel 41B for blue detected by the panel temperature sensor 62 is lower than the second threshold, the panel control section 66 switches the panel control from the first panel control, in which the projection image light G1 to be projected at the first position P1, the projection image light G2 to be projected at the second position P2, the projection image light G3 to be projected at the third position P3, and the projection image light G4 to be projected at the fourth position P4 are sequentially formed at the first refresh rate, to the second panel control, in which the projection image light G1 and the projection image light G3 are sequentially formed at the second refresh rate, which is lower than the first refresh rate.

As for the control of the liquid crystal panel 41B for blue, when the temperature of the liquid crystal panel 41B for blue is lower than the second threshold, the panel control section 66 switches the panel control from the first panel control, in which the blue image light to be projected at the first position P1 and the blue image light to be projected at the positions P2, P3, and P4 are sequentially formed at the first refresh rate, to the second panel control, in which the first image light to be projected at the first position P1 and the first image light to be projected at the third position P3 are sequentially formed at the second refresh rate, which is lower than the first refresh rate. The blue image light corresponds to the first image light, as described above.

According to the configuration described above, the panel control section 66 can perform the first panel control to form the first image light to be projected at each of the positions at the high refresh rate.

On the other hand, when the panel control section 66 performs the second panel control, the first image light to be projected at the first position and the first image light to be projected at one of the shift positions described above can be sequentially formed at a low refresh rate. Therefore, even when the responsiveness of the liquid crystal material is low, the image projection can be continued with the deterioration of the image quality suppressed.

In the projector 1, the plurality of shift positions, to which the pixel Px is shifted by the optical path shifting module 5, include the second position P2, the third position P3, and the fourth position P4.

The second position P2 is set at a location shifted from the first position P1 toward the positive end of the direction F1.

The third position P3 is set at a location shifted from the second position P2 in the direction F2 toward the positive end thereof, which is perpendicular to the direction F1 toward the positive end thereof.

The fourth position P4 is set at a location shifted from the first position P1 toward the positive end of the direction F2.

The direction F1 toward the positive end thereof corresponds to the first direction, and the direction F2 toward the positive end thereof corresponds to the second direction.

In the first panel control, the panel control section 66 sequentially forms the projection image light G1 to be projected at the first position P1, the projection image light G2 to be projected at the second position P2, the projection image light G3 to be projected at the third position P3, and the projection image light G4 to be projected at the fourth position P4 at the first refresh rate.

In the second panel control, the panel control section 66 sequentially forms the projection image light G1 to be projected at the first position P1 and the projection image light G3 to be projected at the third position P3 at the second refresh rate.

As for the control of the liquid crystal panel 41B for blue, in the first panel control, the panel control section 66 sequentially forms the blue image light to be projected at the first position P1, the blue image light to be projected at the second position P2, the blue image light to be projected at the third position P3, and the blue image light to be projected at the fourth position P4 at the first refresh rate. In the second panel control, the panel control section 66 sequentially forms the blue image light to be projected at the first position P1 and the blue image light to be projected at the third position P3 at the second refresh rate.

The second refresh rate is half the first refresh rate.

In the second shift control, the shift control section 67 shifts the projection image light G1 to be projected at the first position P1 to the first position P1 at the timing when the projection image light G1 is formed, and shifts the projection image light G3 to be projected at the third position P3 to the third position P3 at the timing when the projection image light G3 is formed.

That is, in the second shift control, the shift control section 67 shifts the projection image light G1 to the first position P1 at the timing when the blue image light to be projected at the first position P1 is formed, and shifts the projection image light G3 to the third position P3 at the timing when the blue image light to be projected at the third position P3 is formed.

According to the configuration described above, when the temperature of the liquid crystal panel 41B for blue is higher than or equal to the second threshold, a high-resolution image having resolution four times higher than the resolution achieved when the optical path shifting module 5 does not operate. The same holds true for a case where the temperature of each of the liquid crystal panel 41G for green and the liquid crystal panel 41R for red is higher than or equal to the second threshold.

On the other hand, when the temperature of the liquid crystal panel 41B for blue is lower than the second threshold, the projection image light G1 and the projection image light G3 are alternately projected. The refresh rate of the liquid crystal panel 41B for blue at this point of time is the second refresh rate, which is half the first refresh rate used when the first panel control is performed. Therefore, even when the responsiveness of the liquid crystal panel 41B for blue is low, lowering the refresh rate of the liquid crystal panel 41B for blue allows the projection image light to be sequentially projected at the first position P1 and the third position P3. The image projection can therefore be maintained with the deterioration of the image quality of the projected image suppressed. The same holds true for a case where the temperature of at least one of the liquid crystal panel 41G for green and the liquid crystal panel 41R for red is lower than the second threshold.

In the projector 1, the panel module 4G for green includes the liquid crystal panel 41G for green, which outputs the green image light. The green image light corresponds to the second image light, and the liquid crystal panel 41G for green corresponds to the liquid crystal panel for second light.

The panel module 4R for red includes the liquid crystal panel 41R for red, which outputs the red image light. The red image light corresponds to the third image light, and the liquid crystal panel 41R for red corresponds to the liquid crystal panel for third light.

The panel temperature sensor 62 includes the temperature sensor 62B for blue, the temperature sensor 62G for green, and the temperature sensor 62R for red.

The temperature sensor 62B for blue corresponds to a first panel sensor and detects the temperature of the liquid crystal panel 41B for blue.

The temperature sensor 62G for green corresponds to a second panel sensor and detects the temperature of the liquid crystal panel 41G for green.

The temperature sensor 62R for red corresponds to a third panel sensor and detects the temperature of the liquid crystal panel 41R for red.

When the temperature of at least one of the liquid crystal panel 41B for blue, the liquid crystal panel 41G for green, and the liquid crystal panel 41R for red is lower than the second threshold, the shift control section 67 operates the optical path shifting module 5 under the second shift control. When the temperature of the at least one liquid crystal panel is lower than the second threshold, the panel control section 66 operates the liquid crystal panel 41B for blue, the liquid crystal panel 41G for green, and the liquid crystal panel for third light under the second panel control.

According to the configuration described above, when the temperature of the liquid crystal panel 41B for blue, the temperature of the liquid crystal panel 41G for green, and the temperature of the liquid crystal panel 41R for red are each higher than or equal to the second threshold, the shift control section 67 performs the first shift control, and the panel control section performs the first panel control.

On the other hand, when the temperature of at least one liquid crystal panel 41 of the liquid crystal panels 41B, 41G, and 41R is lower than the second threshold, the shift control section 67 performs the second shift control, and the panel control section 66 performs the second panel control.

The liquid crystal panels 41B, 41G, and 41R and the optical path shifting module 5 can therefore be operated in accordance with the responsiveness of the liquid crystal panels 41B, 41G, and 41R.

The projector 1 includes the actuator temperature sensor 61, which detects the temperature of the first actuator 55 and the temperature of the second actuator 56, and the thermoelectric conversion device control section 65, which controls the thermoelectric conversion device 44B for blue.

When the detected temperature of at least one of the first actuator 55 and the second actuator 56 is higher than the first threshold, the thermoelectric conversion device control section 65 reduces the output of the thermoelectric conversion device 44B for blue. The first threshold corresponds to the predetermined value.

The first actuator 55 includes the first driver 551 including the first magnet 552 and the first coil 553, and the second driver 555 including the first magnet 556 and the first coil 557. Therefore, when the temperature of the first actuator 55 increases and the temperatures of the first magnets 552 and 556 therefore increase, the first magnets 552 and 556 are demagnetized. The same holds true for the second actuator 56 including the second magnets 562 and 566 and the second coils 563 and 567.

In contrast, when the temperature of at least one of the first actuator 55 and the second actuator 56 is higher than the first threshold, the thermoelectric conversion device control section 65 reduces the outputs of the thermoelectric conversion devices 44B, 44G, and 44R. As for the thermoelectric conversion device 44B for blue, when the temperature of the at least one actuator is higher than the first threshold, the thermoelectric conversion device control section 65 reduces the output of the thermoelectric conversion device 44B for blue. A further increase in the temperature of each of the actuators 55 and 56 can thus be suppressed. Deterioration of the performance of each of the actuators 55 and 56 can therefore be suppressed.

First Variation of First Embodiment

The first actuator 55 provided in the optical path shifting module 5 according to the first embodiment described above includes the first driver 551 disposed at a position shifted from the first swing axis Rx1 toward the positive end of the direction Y, and the second driver 555 disposed at a position shifted from the first swing axis Rx1 toward the negative end of the direction Y. As described above, the direction Y toward the positive end thereof is the direction in which the extension 425 extends from the contact section 424, and the direction Y toward the negative end thereof is the opposite direction of the direction Y toward the positive end thereof, but not necessarily.

The first actuator 55 of the optical path shifting module 5 may not include one of the first driver 551 and the second driver 555.

For example, the first actuator 55 may not include the first driver 551 including the first magnet 552 and the first coil 553, but may include the second driver 555 disposed at a position shifted from the first swing axis Rx1 toward the negative end of the direction Y. In this case, the magnets 556, 562, and 566 provided in the optical path shifting module 5 can be reliably separate from the regions Ar1B and Ar2R described above. The occurrence of demagnetization of the magnets 556, 562, and 566 can therefore be suppressed.

In the thus configured projector 1, the first actuator 55 and the second actuator 56 are each disposed on the opposite side of the first swing axis Rx1 from the side facing the positive end of the direction Y, in which the extension 425 of the heat diffuser 42 extends from the contact section 424.

According to the configuration described above, the first actuator 55 and the second actuator 56 can be disposed at positions further separate from the thermoelectric conversion device 44B for blue. Deterioration of the performance of each of the actuators 55 and 56 due to the heat can therefore be suppressed.

Second Variation of First Embodiment

The panel modules 4 according to the first embodiment described above each include the cooler 45, which is a heat sink, but not necessarily. The cooler 45 may be a cooler through which a liquid refrigerant can flow and which dissipates the heat transferred to the cooler 45 to the liquid refrigerant.

Second Embodiment

A second embodiment of the present disclosure will next be described.

The projector according to the present embodiment has the same configuration as that of the projector 1 according to the first embodiment but differs therefrom in terms of the configuration of the optical path shifting module. In the following description, portions that are the same or substantially the same as the portions having been already described have the same reference characters and will not be described.

Schematic Configuration of Projector

Figure 17:
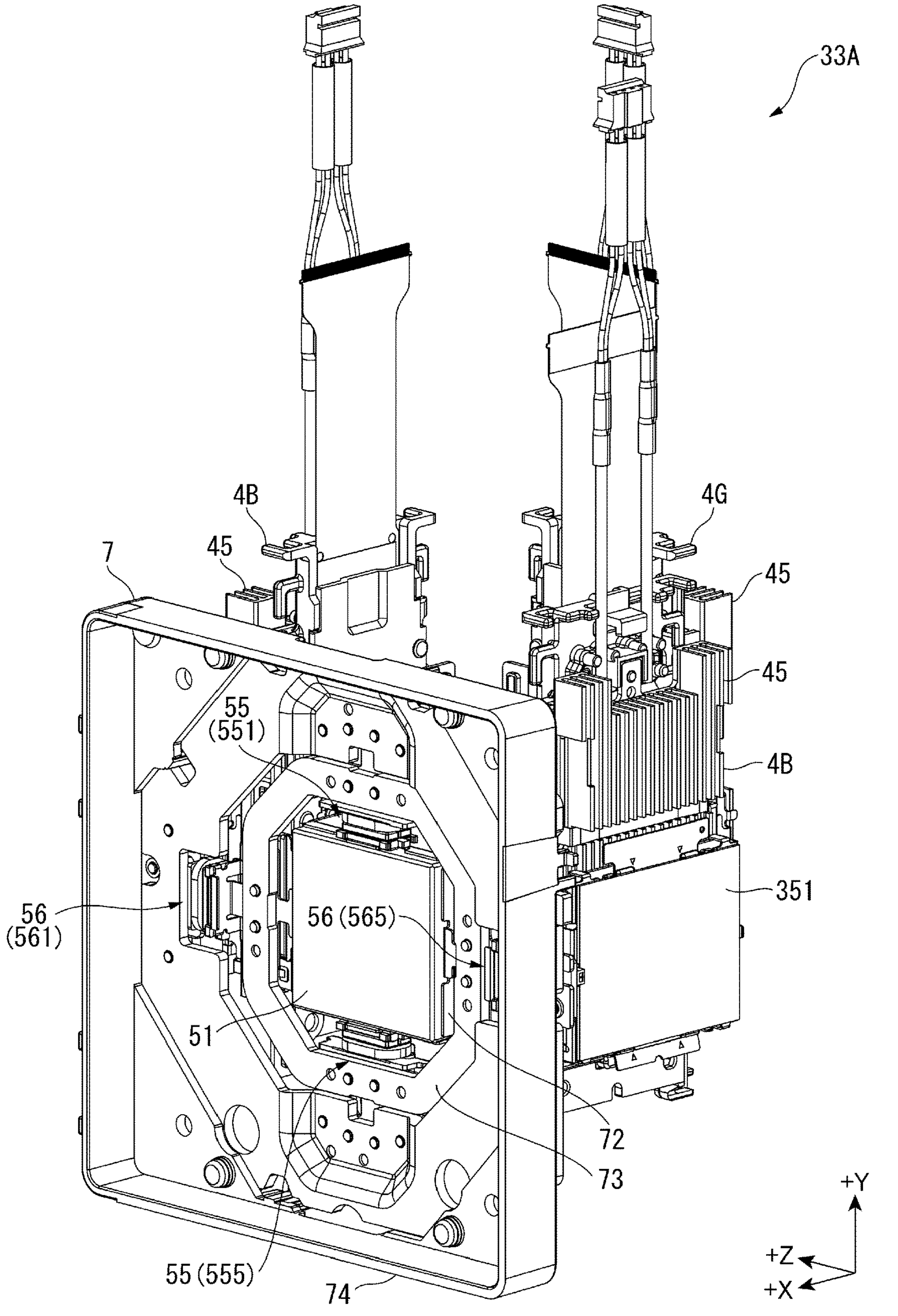
FIG. 17 is a perspective view showing an image formation unit provided in the projector according to a second embodiment.

FIG. 17 is a perspective view showing an image formation unit 33A provided in the projector according to the present embodiment. In detail, FIG. 17 is a perspective view showing the image formation unit 33A viewed from the blue light incident side and the projection image light exiting side. Note that FIG. 17 shows the direction X toward the positive end thereof, the direction Y toward the positive end thereof, and the direction Z toward the positive end thereof in the panel module 4B for blue.

The projector according to the present embodiment has the same configuration and functions as those of the projector 1 according to the first embodiment except that the image formation unit 33 is replaced with the image formation unit 33A shown in FIG. 17.

The image formation unit 33A modulates the incident blue light, green light, and red light, combines the modulated blue light, green light, and red light with one another to form projection image light, and outputs the formed projection image light to the projection optics module 37, as the image formation unit 33 does. The image formation unit 33A has the same configuration and functions as the image formation unit 33 except that the optical path shifting module 5 is replaced with an optical path shifting module 7. That is, the image formation unit 33A includes the field lenses 34, the light modulation modules 35, the light combiner 36, and the optical path shifting module 7.

Configuration of Optical Path Shifting Module

Figure 18:
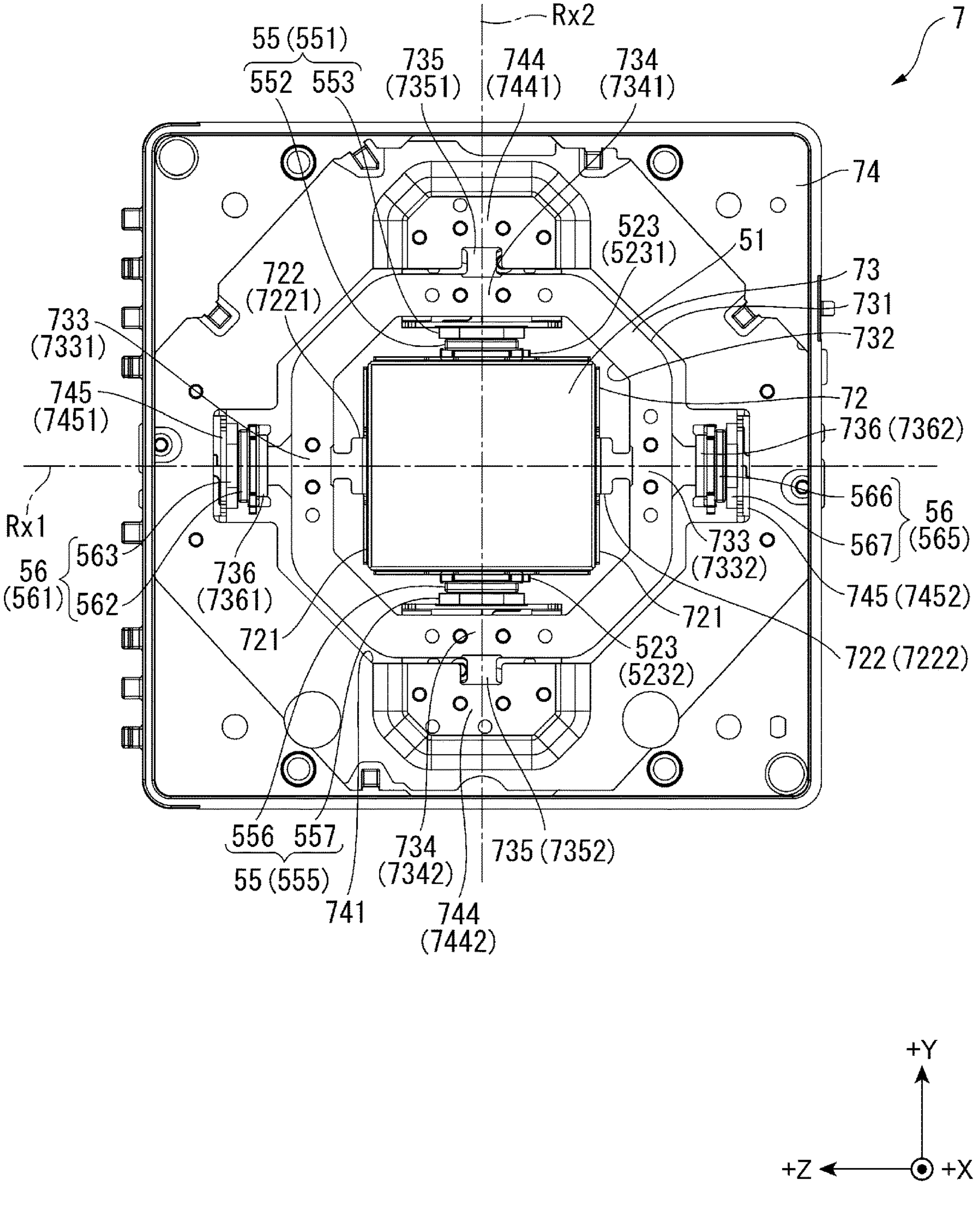
FIG. 18 shows the optical path shifting module according to the second embodiment.

FIG. 18 shows the optical path shifting module 7 viewed from the light exiting side.

The optical path shifting module 7 is disposed in the optical path between the light combiner 36 and the projection optics module 37, and shifts the optical path of the projection image light output from the light combiner 36 under the control of the controller 6, as in the case of the optical path shifting module 5. The optical path shifting module 7 has the same configuration and functions as those of the optical path shifting module 5 except that the first movable section 52, the second movable section 53, and the base 54 are replaced with a first movable section 72, a second movable section 73, and a base 74, as shown in FIG. 18. That is, the optical path shifting module 7 includes the optical path changing member 51, the first movable section 72, the second movable section 73, the base 74, the first actuator 55, and the second actuator 56.

Note that FIG. 18 shows the direction X toward the positive end thereof, the direction Y toward the positive end thereof, and the direction Z toward the positive end thereof in the panel module 4B combined with the optical path shifting module 7 in the image formation unit 33A. Specifically, in the plane of view of FIG. 18, the direction X toward the positive end thereof is the direction perpendicular to and away from the plane of view, the direction Y toward the positive end thereof is the upward direction, and the direction Z toward the positive end thereof is the leftward direction. It is assumed that a swing axis along the optical axis of the panel module 4B for blue and the panel module 4R for red is the first swing axis Rx1, and that a swing axis perpendicular to each of the optical axis of the panel modules 4B and 4R and the optical axis of the panel module 4G for green is the second swing axis Rx2. The first swing axis Rx1 is an axis along the axis Z, and the second swing axis Rx2 is an axis along the axis Y.

Configuration of First Movable Section

The first movable section 72 is formed in the shape of a rectangular frame, holds the optical path changing member 51, and further holds the first magnets 552 and 556 of the first actuator 55. The first movable section 72 is supported by the second movable section 53 so as to be swingable around the first swing axis Rx1. The first movable section 72 has the same configuration and functions as those of the first movable section 52 except that the shaft section 522 is replaced with a linkage section 722. That is, the first movable section 72 includes the frame section 521, the fixing section 523, to which the first magnets 552 and 556 are fixed, and the linkage section 722.

The linkage section 722 is a section linked to the second movable section 73. The linkage section 722 includes a linkage section 7221, which protrudes from an outer circumferential portion of the frame section 721 toward the positive end of the direction Z, and a linkage section 7222, which protrudes from an outer circumferential portion of the frame section 721 toward the negative end of the direction Z. The linkage sections 7221 and 7222, which bend, allow the first movable section 72 to swing around the first swing axis Rx1 relative to the second movable section 73. Note that the linkage sections 7221 and 7222 are disposed on the first swing axis Rx1.

Configuration of Second Movable Section

The second movable section 73 holds the first coils 553 and 557 of the first actuator 55 and the second magnets 562 and 566 of the second actuator 56 in addition to the first movable section 72 so as to be swingable around the first swing axis Rx1. The second movable section 73 includes a frame section 731, an opening 732, a swing support section 733, a support section 734, a shaft section 735, and a fixing section 736.

The frame section 731 is formed in the shape of a substantially octagonal frame when viewed from the light exiting side. The opening 732 is provided at the center of the frame section 731.

The opening 732 passes through the frame section 731 along the direction X extending toward the positive end thereof, which is the direction in which the projection image light passes. The first movable section 72 is disposed in the opening 732.

The swing support section 733 includes a swing support section 7331 provided at the inner edge facing the positive end of the direction Z out of the inner edges of the opening 732, and a swing support section 7332 provided at the inner edge facing the negative end of the direction out of the inner edges Z of the opening 732. The linkage section 7221 is linked to the swing support section 7331, and the linkage section 7222 is linked to the swing support section 7332. The first movable section 72 is thus supported by the second movable section 73.

The support section 734 includes a support section 7341 provided at the inner edge facing the positive end of the direction Y out of the inner edges of the opening 732, and a support section 7342 provided at the inner edge facing the negative end of the direction Y out of the inner edges of the opening 732. The support section 7341 supports the first coil 553, and the support section 7342 supports the first coil 557.

The shaft section 735 includes a shaft section 7351, which protrudes from an outer circumferential portion of the frame section 731 toward the positive end of the direction Y, and a shaft section 7352, which protrudes from an outer circumferential portion of the frame section 731 toward the negative end of the direction Y. The shaft sections 7351 and 7352 are supported by the base 74, so that the second movable section 73 is supported by the base 74 so as to be swingable around the second swing axis Rx2. The extension of the center axis of the shaft section 7351 and the extension of the center axis of the shaft section 7352 coincide with each other, and the extensions of the center axes of the shaft sections 7351 and 7352 form the second swing axis Rx2.

The fixing section 736 includes a fixing section 7361, which protrudes from an outer circumferential portion of the frame section 731 toward the positive end of the direction Z, and a fixing section 7362, which protrudes from an outer circumferential portion of the frame section 731 toward the negative end of the direction Z. The second magnet 562 is fixed to the fixing section 7361, and the second magnet 566 is fixed to the fixing section 7362. The fixing sections 7361 and 7362 function as yokes for the magnets 562 and 566, respectively.

Configuration of Base

The base 74 is a frame formed in a substantially rectangular shape when viewed from the light exiting side of the optical path shifting module 7. The base 74 holds the second coils 563 and 567 of the second actuator 56 in addition to the second movable section 73 so as to be swingable around the second swing axis Rx2.

The base 74 has an opening 741, through which the projection image light passes. The opening 741 is formed in a shape according to the outer shape of the second movable section 73, and the second movable section 73 is disposed in the opening 741.

The base 74 further includes a rotation support section 744 and a support section 745.

The rotation support section 744 includes a rotation support section 7441 provided at the inner edge facing the positive end of the direction Y out of the inner edges of the opening 741, and a rotation support section 7442 provided at the inner edge facing the negative end of the direction Y out of the inner edges of the opening 741. The rotation support section 7441 rotatably supports the shaft section 7351, and the rotation support section 7442 rotatably supports the shaft section 7352. The second movable section 73 is thus supported so as to be swingable around the second swing axis Rx2.

The support section 745 includes a support section 7451 provided at the inner edge facing the positive end of the direction Z out of the inner edges of the opening 741, and a support section 7452 provided at the inner edge facing the negative end of the direction Z out of the inner edges of the opening 741. The support section 7451 supports the second coil 563, and the support section 7452 supports the second coil 567.

Configuration of First Actuator

In the optical path shifting module 7, the first actuator 55 swings the optical path changing member 51 around the first swing axis Rx1 by swinging the first movable section 72.

Out of the first driver 551 and the second driver 555 provided in the first actuator 55, the first driver 551 is disposed at a position that is on the second swing axis Rx2 and is shifted from the first swing axis Rx1 toward the positive end of the direction Y, and the second driver 555 is disposed at a position that is on the second swing axis Rx2 and is shifted from the first swing axis Rx1 toward the negative end of the direction Y. That is, also in the optical path shifting module 7, the first actuator 55 is disposed at a position on the second swing axis Rx2.

The first driver 551 includes the first magnet 552 fixed to the fixing section 5231 of the first movable section 72, and the first coil 553 supported by the second movable section 73.

The second driver 555 includes the first magnet 556 fixed to the fixing section 5232 of the first movable section 72, and the first coil 557 supported by the second movable section 73.

Configuration of Second Actuator

In the optical path shifting module 7, the second actuator 56 swings the optical path changing member 51 around the second swing axis Rx2 by swinging the second movable section 73.

Out of the first driver 561 and the second driver 565 provided in the second actuator 56, the first driver 561 is disposed at a position that is on the first swing axis Rx1 and is shifted from the second swing axis Rx2 toward the positive end of the direction Z, and the second driver 565 is disposed at a position that is on the first swing axis Rx1 and is shifted from the second swing axis Rx2 toward the negative end of the direction Z. That is, in the optical path shifting module 7, the second actuator 56 is disposed at a position on the first swing axis Rx1.

The first driver 561 includes the second magnet 562 fixed to the second movable section 73, and the second coil 563 supported by the base 74.

The second driver 565 includes the second magnet 566 fixed to the second movable section 73, and the second coil 567 supported by the base 74.

Arrangement of Actuators

Figure 19:
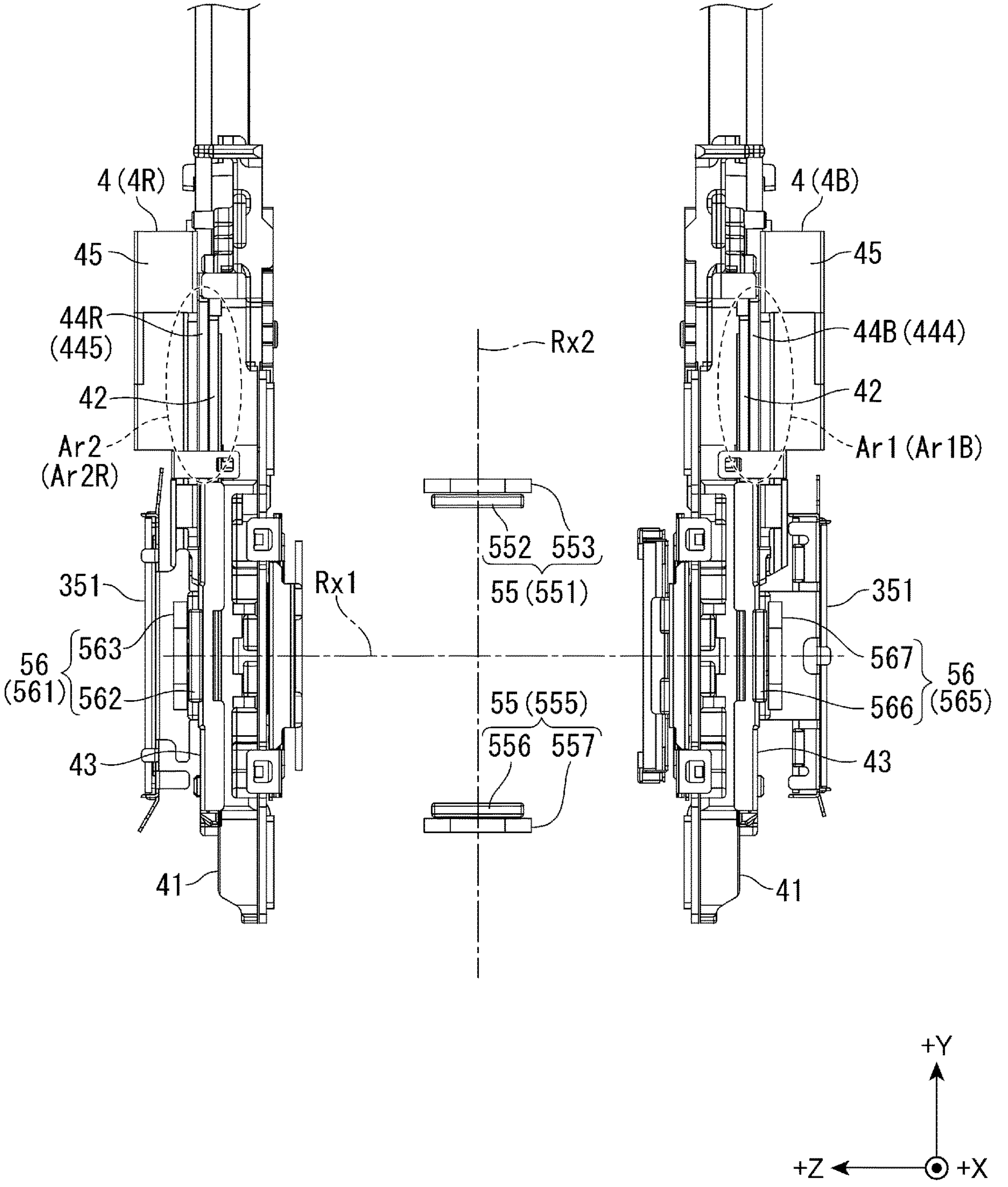
FIG. 19 shows the positional relationship between a portion of the panel modules and the actuators according to the second embodiment.

FIG. 19 shows the positional relationship of the panel modules 4B and 4R with the actuators 55 and 56 viewed from the light exiting side of the optical path shifting module 7. In other words, FIG. 19 shows the positional relationship of the regions Ar1B and Ar2R with the actuators 55 and 56. Note that FIG. 19 shows the direction X toward the positive end thereof, the direction Y toward the positive end thereof, and the direction Z toward the positive end thereof in the panel module 4B for blue.

Also in the present embodiment, the magnets 552, 556, 562, and 566 are disposed at positions separate from the regions Ar1B and Ar2R, as shown in FIG. 19.

Specifically, the first magnet 552 is disposed at a position separate from the region Ar1B toward the negative end of the direction Y, and further separate from the region Ar2R toward the negative ends of the directions Y and Z.

The first magnet 556 is disposed at a position separate from the region Ar1B toward the negative end of the direction Y and the positive end of the direction Z, and further separate from the region Ar2R toward the negative end of the directions Y.

The second magnet 562 is disposed at a position separate from the region Ar1B toward the positive end of the direction Z, and further separate from the region Ar2R toward the negative end of the directions Z.

The second magnet 566 is disposed at a position separate from the region Ar1B toward the negative end of the direction Y and the positive end of the direction Z, and further separate from the region Ar2R toward the negative ends of the directions Y and Z.

As described above, the direction Y toward the negative end thereof is the opposite direction of the direction in which the extension 425 extends from the contact portion 424.

The fact that the magnets 552, 556, 562, and 566 are separate from the regions Ar1B and Ar2R as described above allows suppression of the thermal effect of the thermoelectric conversion devices 44B and 44R on the magnets 552, 556, 562, and 566. Note that the panel module 4G for green is provided at the side opposite from the optical path shifting module 5 with the light combiner 36 interposed therebetween, as in the first embodiment. The thermal effect of the thermoelectric conversion device 44G for green on the magnets 552, 556, 562, and 566 can therefore be suppressed.

The occurrence of the demagnetization of the magnets 552, 556, 562, and 566 due to the heat can therefore be suppressed, so that the hindered operation of the optical path shifting module 7 due to the heat can be suppressed.

Effects of Second Embodiment

The projector according to the present embodiment described above provides the effects below as well as the same effects provided by the projector 1 according to the first embodiment.

The optical path shifting module 7 includes the first movable section 72, the second movable section 73, and the base 74.

The first movable section 72 holds the optical path changing member 51.

The second movable section 73 holds the first movable section 72 so as to be swingable around the first swing axis Rx1.

The base 74 holds the second movable section 73 so as to be swingable around the second swing axis Rx2.

The first actuator 55 is disposed on the second swing axis Rx2 and between the first movable section 72 and the second movable section 73 when viewed from the light exiting side of the optical path shifting module 7. The first actuator 55 swings the first movable section 72 around the first swing axis Rx1.

The second actuator 56 is disposed on the first swing axis Rx1 and between the second movable section 73 and the base 74. The second actuator 56 swings the second movable section 73 around the second swing axis Rx2.

According to the configuration described above, the actuators 55 and 56 can swing the optical path changing member 51 around the first swing axis Rx1 and the second swing axis Rx2, respectively, as the optical path shifting module 5 according to the first embodiment can. The plurality of pixels contained in the projection image light can therefore be shifted to a plurality of positions.

Furthermore, the actuators 55 and 56 can be disposed at positions separate from the region Ar1B corresponding to the side end 444 of the thermoelectric conversion device 44B for blue, and the actuators 55 and 56 can be disposed at positions separate from the region Ar2R corresponding to the side end 445 of the thermoelectric conversion device 44R for red. Deterioration of the performance of each of the actuators 55 and 56 due to the heat can therefore be suppressed.

Variations of Embodiments

The present disclosure is not limited to the embodiments described above, and variations, improvements, and other modifications to the extent that the advantage of the present disclosure is achieved fall within the scope of the present disclosure.

It is assumed in each of the embodiments described above that the panel modules 4B, 4G, and 4R have the same configuration. That is, it is assumed that the panel modules 4B, 4G, and 4R each include the liquid crystal panel 41, the heat diffuser 42, the holding member 43, the thermoelectric conversion device 44, and the cooler 45, but not necessarily. The configuration of at least one of the panel modules 4B, 4G, and 4R may differ from the configurations of the other panel modules.

For example, the panel modules 4B and 4G may each include the liquid crystal panel 41, the heat diffuser 42, the holding member 43, the thermoelectric conversion device 44, and the cooler 45, and the red panel module 4R for red may not include at least one of the heat diffuser 42 and the thermoelectric conversion device 44. The holding member 43 may be omitted.

It is assumed in each of the embodiments described above that the first actuator 55 includes the first driver 551 and the second driver 555, and that the second actuator 56 includes the first driver 561 and the second driver 565, but not necessarily. The first actuator 55 only needs to include one of the first driver 551 and the second driver 555, and the second actuator 56 only needs to include one of the first driver 561 and the second driver 565, as described above.

It is assumed in each of the embodiments described above that the first magnets 552 and 556 and the second magnets 562 and 566 are disposed in regions outside the panel module 4B for blue and at positions separate from the region Ar1B corresponding to the side end 444, which is the end facing the optical path shifting module 5 or 7 out of the ends of the thermoelectric conversion device 44B for blue. However, the first magnets 552 and 556 and the second magnets 562 and 566 only need be separate from the side end 444 of the thermoelectric conversion device 44B for blue. Therefore, at least a portion of any of the magnets may be disposed in the region Ar1B as long as the portion is separate from the side end 444.

Similarly, it is assumed in each of the embodiments described above that the first magnets 552 and 556 and the second magnets 562 and 566 are disposed in regions outside the panel module 4R for red and at positions separate from the region Ar2R corresponding to the side end 445, which is the end facing the optical path shifting module 5 or 7 out of the ends of the thermoelectric conversion device 44R for red. However, the first magnets 552 and 556 and the second magnets 562 and 566 only need be separate from the side end 445 of the thermoelectric conversion device 44R for red. Therefore, at least a portion of any of the magnets may be disposed in the region Ar2R as long as the portion is separate from the side end 445.

Furthermore, the directions in which the first magnets 552 and 556 and the second magnets 562 and 566 are separate from the side ends 444 and 445 are not limited to those described above.

It is assumed in each of the embodiments described above that the first actuator 55 is disposed on the second swing axis Rx2, but not necessarily. The first actuator 55 may be disposed at a position displaced from the second swing axis Rx2. For example, the first actuator 55 may be displaced from the second swing axis Rx2 toward the projection image light exiting side, or may be displaced toward the projection image light incident side. Furthermore, the first actuator 55 may be displaced from the second swing axis Rx2 toward the panel module 4B for blue, or may be displaced toward the panel module 4R for red.

It is assumed in each of the embodiments described above that the panel temperature sensor 62 includes the temperature sensor 62B for blue, which detects the temperature of the liquid crystal panel 41B for blue, the temperature sensor 62G for green, which detects the temperature of the liquid crystal panel 41G for green, and the temperature sensor 62R for red, which detects the temperature of the liquid crystal panel 41R for red, but not necessarily. At least one of the temperature sensors 62B, 62G, and 62R may be omitted. For example, the panel temperature sensor 62 may include only the temperature sensor 62B for blue.

It is assumed in each of the embodiments described above that the shift control section 67 performs one of the first shift control and the second shift control based on the temperatures of the liquid crystal panels 41B, 41G, and 41R, but not necessarily. The shift control section 67 may perform one of the two types of shift control, for example, based only on the temperature of the liquid crystal panel 41B for blue.

The shift control section 67 may instead perform one of the first shift control and the second shift control irrespective of the temperatures of the liquid crystal panels 41B, 41G, and 41R.

It is further assumed in the second shift control that the shift control section 67 shifts the optical path of the projection image light in such a way that the projection image light is projected at the first position P1 and the third position P3, but not necessarily. The shift control section 67 may shift the optical path of the projection image light in such a way that the projection image light is projected at the first position P1 and the second position P2 or the fourth position P4. That is, the shift control section 67 may shift the optical path of the projection image light in such a way that the projection image light is projected at two of the positions P1 to P4.

It is assumed in each of the embodiments described above that the panel control section 66 performs one of the first panel control and the second panel control based on the temperatures of the liquid crystal panels 41B, 41G, and 41R, but not necessarily. The panel control section 66 may perform one of the two types of panel control, for example, based only on the temperature of the liquid crystal panel 41B for blue.

The panel control section 66 may instead perform one of the first panel control and the second panel control irrespective of the temperatures of the liquid crystal panels 41B, 41G, and 41R.

It is assumed in each of the embodiments described above that the panel control section 66 sets the refresh rate of the liquid crystal panels 41B, 41G, and 41R to 240 Hz in the first panel control, and sets the refresh rate of the liquid crystal panels 41B, 41G, and 41R to 120 Hz in the second panel control. However, the refresh rate of each of the liquid crystal panels 41B, 41G, and 41R in the first panel control is not limited to 240 Hz, and may be any other frequency. Similarly, the refresh rate of each of the liquid crystal panels 41B, 41G, and 41R in the second panel control is not limited to 120 Hz, and may be any other frequency. That is, the refresh rate of the liquid crystal panels 41B, 41G, and 41R to 240 Hz in the second panel control only needs to be lower than the refresh rate of the liquid crystal panels 41B, 41G, and 41R in the first panel control.

It is assumed in each of the embodiments described above that the actuator temperature sensor 61, which detects the temperature of the first actuator 55 and the temperature of the second actuator 56, includes the first temperature sensor 611, which detects the temperature of the first magnet 552, the second temperature sensor 612, which detects the temperature of the first magnet 556, the third temperature sensor 613, which detects the temperature of the second magnet 562, and the fourth temperature sensor 614, which detects the temperature of the second magnet 566, but not necessarily. The actuator temperature sensor 61 may include a temperature sensor that detects the temperature of the magnet closer to the region Ar1B or Ar2R out of the first magnets 552 and 556, and a temperature sensor that detects the temperature of the magnet closer to the region Ar1B or Ar2R out of the second magnets 562 and 566. The actuator temperature sensor 61 may instead include only a temperature sensor that detects the temperature of the magnet closest to the region Ar1B or Ar2R out of the magnets 552, 556, 562 and 566. Still instead, the actuator temperature sensor 61 may be omitted.

It is assumed in each of the embodiments described above that when the temperature of at least one of the first actuator 55 and the second actuator 56 is higher than the predetermined value, the thermoelectric conversion device control section 65 reduces the outputs of the thermoelectric conversion devices 44B, 44G, and 44R. That is, when the temperature of at least one of the magnets 552, 556, 562, and 566 is higher than the first threshold, the thermoelectric conversion device control section 65 reduces the outputs of the thermoelectric conversion devices 44B, 44G, and 44R, but not necessarily. Even when the temperature of at least one of the magnets 552, 556, 562, and 566 is higher than the first threshold, the thermoelectric conversion device control section 65 may not reduce the outputs of the thermoelectric conversion devices 44B, 44G, and 44R.

It is assumed in each of the embodiments described above that the image projection apparatus 3 includes the light source 31, the color separation module 32, the image formation unit 33, and the projection optics module 37, which are arranged in the layout shown in FIG. 1, but not necessarily. The configuration and layout of the image projection apparatus 3 can be changed as appropriate.

Summary of Present Disclosure

The present disclosure will be summarized below as additional remarks.

Additional Remark 1

A projector including a first panel module that has a first axis as the optical axis and outputs first image light that is modulated first light, a second panel module that has a second axis perpendicular to the first axis as the optical axis and outputs second image light that is modulated second light, a third panel module that has the first axis as the optical axis and outputs third image light that is modulated third light, a light combiner having a first light incident surface on which the first image light is incident, a second light incident surface on which the second image light is incident, a third light incident surface on which the third image light is incident, and a light exiting surface which has the second axis as the optical axis and via which projection image light exits, the projection image light being the combination of the first image light, the second image light, and the third image light, a projection optics module that projects the projection image light output from the light combiner, and an optical path shifting module that shifts the optical path of the projection image light that is output from the light combiner and enters the projection optics module, the optical path shifting module including an optical path changing member disposed in the optical path between the light combiner and the projection optics module, a first actuator that includes a first magnet and a first coil and swings the optical path changing member around a first swing axis along the first axis, and a second actuator that includes a second magnet and a second coil and swings the optical path changing member around a second swing axis along a third axis perpendicular to each of the first axis and the second axis, the first panel module including a liquid crystal panel for first light that outputs the first image light, a heat diffuser for first light that extends from the liquid crystal panel for first light along the third axis, transfers heat to and from the liquid crystal panel for first light, and diffuses the received heat in the heat diffuser for first light, a thermoelectric conversion device for first light that transfers heat to and from the heat diffuser for first light, and a cooler for first light that cooperates with the heat diffuser for first light to sandwich the thermoelectric conversion device for first light and transfers heat to and from the thermoelectric conversion device for first light, the first actuator and the second actuator each being disposed at a position separate from a side end facing the optical path shifting module out of the side ends of the thermoelectric conversion device for first light.

According to the configuration described above, when the surface in contact with the heat diffuser for first light out of the surfaces of the thermoelectric conversion device for first light serves as a heat generating surface, the heat generated by the thermoelectric conversion device for first light is transferred to the heat diffuser for first light, then diffused in the heat diffuser for first light, and transferred to the liquid crystal panel for first light. Therefore, when the temperature of the liquid crystal panel for first light is low, the liquid crystal panel for first light can be heated.

On the other hand, the heat generated in the liquid crystal panel for first light is dissipated to the heat diffuser for first light and then diffused in the heat diffuser for first light. In this process, the thermoelectric conversion device for first light absorbs the heat of the heat diffuser for first light and dissipates the absorbed heat to the cooler for first light, so that the heat generated in the liquid crystal panel for first light can be quickly dissipated to the cooler for first light. Therefore, when the temperature of the liquid crystal panel for first light is high, the liquid crystal panel for first light can be cooled.

As described above, using the thermoelectric conversion device for first light allows adjustment of the temperature of the liquid crystal panel for first light to an appropriate temperature in a short period, so that the responsiveness of the liquid crystal panel for first light can be maintained in a satisfactory state in the short period. Swinging the optical path changing member around each of the first swing axis and the second swing axis therefore allows high-speed pixel shift performed by the optical path shifting module, which shifts the positions of a plurality of pixels contained in the projection image light.

Furthermore, even when the thermoelectric conversion device for first light generates a relatively large amount of heat, the first actuator and the second actuator are disposed at positions separate from the side end facing the optical path shifting module out of the side ends of the thermoelectric conversion device for first light. The effect of the heat conveyed by the thermoelectric conversion device for first light on the actuators can thus be suppressed. Deterioration of the performance of each of the actuators due to the heat can therefore be suppressed.

As described above, the responsiveness of the liquid crystal material of the liquid crystal panel for first light and the operational performance of the actuators provided in the optical path shifting module can be maintained in a satisfactory state, so that an image having good image quality and high pseudo-resolution can be projected.

Additional Remark 2

The projector described in the additional remark 1, in which the third panel module includes a liquid crystal panel for third light that outputs the third image light, a heat diffuser for third light that extends from the liquid crystal panel for third light along the third axis, transfers heat to and from the liquid crystal panel for third light, and diffuses the received heat in the heat diffuser for third light, a thermoelectric conversion device for third light that transfers heat to and from the heat diffuser for third light, and a cooler for third light that cooperates with the heat diffuser for third light to sandwich the thermoelectric conversion device for third light and transfers heat to and from the thermoelectric conversion device for third light, and the first actuator and the second actuator are each disposed at a position separate from a side end facing the optical path shifting module out of the side ends of the thermoelectric conversion device for third light.

According to the configuration described above, the effect of the heat conveyed by the thermoelectric conversion device for third light on the first actuator and the second actuator can be suppressed, as in the case of the thermoelectric conversion device for first light. Deterioration of the performance of the actuators due to the heat conveyed by the thermoelectric conversion device for third light can therefore be suppressed.

Additional Remark 3

The projector described in the additional remark 1 or 2, in which the first actuator is disposed on the second swing axis.

The second swing axis is a swing axis along the third axis perpendicular to each of the first axis and the second axis, as described above. The first actuator is therefore disposed at a position separate from the first panel module and the third panel module. The effect of the heat from the thermoelectric conversion device for first light on the actuators can therefore be suppressed. The same holds true for a case where the third panel module includes the thermoelectric conversion device for third light.

Additional Remark 4

The projector described in the additional remark 3, in which the first actuator and the second actuator are each disposed on the opposite side of the first swing axis from the side toward which the heat diffuser for first light extends.

According to the configuration described above, the first actuator and the second actuator can be disposed at positions further separate from the thermoelectric conversion device for first light. Deterioration of the performance of each of the actuators due to the heat can therefore be suppressed.

Additional Remark 5

The projector described in any one of the additional remarks 1 to 3, in which the optical path shifting module includes a first movable section that holds the optical path changing member, a second movable section that holds the first movable section so as to be swingable around the first swing axis, and a base that holds the second movable section so as to be swingable around the second swing axis, the first actuator is disposed on the second swing axis and between the first movable section and the second movable section when viewed from the light exiting side of the optical path shifting module, and swings the first movable section around the first swing axis, and the second actuator is disposed between the second movable section and the base on the opposite side of the first swing axis from the side toward which the heat diffuser for first light extends when viewed from the light exiting side of the optical path shifting module, and swings the second movable section around the second swing axis.

According to the configuration described above, the first actuator and the second actuator disposed as described above can swing the optical path changing member around the first swing axis and the second swing axis, respectively. The plurality of pixels contained in the projection image light can therefore be shifted to a plurality of positions.

In the optical path shifting module, the actuators can be disposed at positions separate from the region corresponding to the side end of the thermoelectric conversion device for first light. Deterioration of the performance of each of the actuators due to the heat can therefore be suppressed.

Additional Remark 6

The projector described in any one of the additional remarks 1 to 3, in which the optical path shifting module includes a first movable section that holds the optical path changing member, a second movable section that holds the first movable section so as to be swingable around the first swing axis, and a base that holds the second movable section so as to be swingable around the second swing axis, the first actuator is disposed on the second swing axis and between the first movable section and the second movable section when viewed from the light exiting side of the optical path shifting module, and swings the first movable section around the first swing axis, and the second actuator is disposed on the first swing axis and between the second movable section and the base, and swings the second movable section around the second swing axis.

According to the configuration described above, the first actuator and the second actuator can swing the optical path changing member around the first swing axis and the second swing axis, respectively, as in the optical path shifting module described above. The plurality of pixels contained in the projection image light can therefore be shifted to a plurality of positions.

In the optical path shifting module, the actuators can be disposed at positions separate from the region corresponding to the side end of the thermoelectric conversion device for first light. Deterioration of the performance of each of the actuators due to the heat can therefore be suppressed.

Additional Remark 7

The projector described in any one of the additional remarks 1 to 6, which further includes a panel temperature sensor that detects the temperature of the liquid crystal panels for first light, and a shift control section that controls the optical path shifting module, and in which when the temperature of the liquid crystal panel for first light detected by the panel temperature sensor is lower than a threshold, the shift control section switches shift control from first shift control in which the position of each pixel contained in the projection image light output from the light combiner is sequentially shifted from a first position to a plurality of shift positions to second shift control in which the position of the pixel is sequentially shifted to the first position and one of the plurality of shift positions.

In this process, when the temperature of the liquid crystal panel for light is low, the first responsiveness of the liquid crystal panel for first light decreases, so that the liquid crystal panel for first light cannot form images at a high refresh rate.

In contrast, when the temperature of the liquid crystal panel for first light is low and the responsiveness of the liquid crystal panel for first light is therefore low, the shift control section switches the shift control from the first shift control to the second shift control. Switching the pixel shift around the two axes, the first swing axis and the second swing axis, to the pseudo-single-axis shift as described above allows suppression of deterioration of image quality of images formed by the liquid crystal panel for first light even at a low refresh rate.

On the other hand, when the temperature of the liquid crystal panel for first light reaches an appropriate temperature, the shift control can be switched from the second shift control back to the first shift control. The liquid crystal panel for first light and the optical path shifting module can therefore be operated with suppression of the deterioration of the image quality in accordance with the temperature of the liquid crystal panel for first light.

Additional Remark 8

The projector described in the additional remark 7, which further includes a panel control section that controls the liquid crystal panel for first light, and in which when the temperature of the liquid crystal panel for first light detected by the panel temperature sensor is lower than the threshold, the panel control section switches panel control from first panel control in which the first image light to be projected at the first position and a plurality of ones of the first image light to be projected at the plurality of shift positions are sequentially formed at a first refresh rate to second panel control in which the first image light to be projected at the first position and the first image light to be projected at one of the plurality of shift positions are sequentially formed at a second refresh rate lower than the first refresh rate.

According to the configuration described above, the panel control section can perform the first panel control to form the first image light to be projected at each of the positions at the high refresh rate.

On the other hand, the panel control section can perform the second panel control to sequentially form the first image light to be projected at the first position and the first image light to be projected at the one shift position described above at the low refresh rate. Therefore, even when the responsiveness of the liquid crystal material is low, the image projection can be continued with the deterioration of the image quality suppressed.

Additional Remark 9

The projector described in the additional remark 8, in which the plurality of shift positions include a second position set at the location shifted from the first position in a first direction, a third position set at the location shifted from the second position in a second direction perpendicular to the first direction, and a fourth position set at the location shifted from the first position in the second direction, the panel control section sequentially forms, in the first panel control, the first image light to be projected at the first position, the first image light to be projected at the second position, the first image light to be projected at the third position, and the first image light to be projected at the fourth position at the first refresh rate, and sequentially forms, in the second panel control, the first image light to be projected at the first position and the first image light to be projected at the third position at the second refresh rate, the second refresh rate is half the first refresh rate, and in the second shift control, the shift control section shifts the projection image light to the first position at the timing when the first image light to be projected at the first position is formed, and shifts the projection image light to the third position at the timing when the first image light to be projected at the third position is formed.

According to the configuration described above, when the temperature of the liquid crystal panel for first light is higher than the threshold, a high-resolution image having resolution four times higher than the resolution can be displayed when the optical path shifting module does not operate.

On the other hand, when the temperature of the liquid crystal panel for first light is lower than the threshold, the projection image light to be projected at the first position and the projection image light to be projected at the third position are alternately projected. The refresh rate of the liquid crystal panel for first light in this process is the second refresh rate, which is half the first refresh rate used when the first panel control is performed. Therefore, even when the responsiveness of the liquid crystal panel for first light is low, lowering the refresh rate of the liquid crystal panel for first light allows the projection image light to be sequentially projected at the first position and the third position. The image projection can therefore be maintained with the deterioration of the image quality of the projected image suppressed.

Additional Remark 10

The projector described in the additional remark 8 or 9, in which the second panel module includes a liquid crystal panel for second light that outputs the second image light, the third panel module includes a liquid crystal panel for third light that outputs the third image light, the panel temperature sensor includes a first panel sensor that detects the temperature of the liquid crystal panels for first light, a second panel sensor that detects the temperature of the liquid crystal panels for second light, and a third panel sensor that detects the temperature of the liquid crystal panels for third light, and when the temperature of at least one of the liquid crystal panel for first light, the liquid crystal panel for second light, and the liquid crystal panel for third light is lower than the threshold, the shift control section operates the optical path shifting module under the second shift control, and the panel control section operates the liquid crystal panel for first light, the liquid crystal panel for second light, and the liquid crystal panel for third light under the second panel control.

According to the configuration described above, when the temperature of the liquid crystal panel for first light, the temperature of the liquid crystal panel for second light, and the temperature of the liquid crystal panel for third light are each greater than or equal to the threshold, the shift control section performs the first shift control, and the panel control section performs the first panel control.

On the other hand, when the temperature of at least one of the liquid crystal panel for first light, the liquid crystal panel for second light, and the liquid crystal panel for third light is lower than the threshold, the shift control section performs the second shift control, and the panel control section performs the second panel control on each of the liquid crystal panels.

The liquid crystal panels and the optical path shifting module can therefore be operated in accordance with the responsiveness of the liquid crystal panels.

Additional Remark 11

The projector described in any one of the additional remarks 1 to 10, which further includes an actuator temperature sensor that detects the temperature of the first actuator and the temperature of the second actuator, and a thermoelectric conversion device control section that controls the thermoelectric conversion device for first light, and in which when the temperature of at least one of the first actuator and the second actuator detected by the actuator temperature sensor is higher than a predetermined value, the thermoelectric conversion device control section reduces the output of the thermoelectric conversion device for first light.

The first actuator includes the first magnet and the first coil. Therefore, when the temperature of the first actuator increases and the temperature of the first magnet therefore increases, the first magnet is demagnetized. The same holds true for the second actuator including the second magnet and the second coil.

In contrast, when the temperature of at least one of the first actuator and the second actuator is higher than the predetermined value, the thermoelectric conversion device control section can reduce the output of the thermoelectric conversion device for first light to suppress a further increase in the temperature of each of the actuators. Deterioration of the performance of each of the actuators can therefore be suppressed.

What is claimed is:

1. A projector comprising:

a first panel module that has a first axis as an optical axis and outputs first image light that is modulated first light;

a second panel module that has a second axis perpendicular to the first axis as an optical axis and outputs second image light that is modulated second light;

a third panel module that has the first axis as an optical axis and outputs third image light that is modulated third light;

a light combiner having a first light incident surface on which the first image light is incident, a second light incident surface on which the second image light is incident, a third light incident surface on which the third image light is incident, and a light exiting surface which has the second axis as an optical axis and via which projection image light exits, the projection image light being a combination of the first image light, the second image light, and the third image light;

a projection optics module that projects the projection image light output from the light combiner; and an optical path shifting module that shifts an optical path of the projection image light that is output from the light combiner and enters the projection optics module, wherein the optical path shifting module includes an optical path changing member disposed in the optical path between the light combiner and the projection optics module, a first actuator that includes a first magnet and a first coil and swings the optical path changing member around a first swing axis along the first axis, and a second actuator that includes a second magnet and a second coil and swings the optical path changing member around a second swing axis along a third axis perpendicular to each of the first axis and the second axis, the first panel module includes a liquid crystal panel for first light that outputs the first image light, a vapor chamber for first light that extends from the liquid crystal panel for first light along the third axis, transfers heat to and from the liquid crystal panel for first light, and diffuses the received heat in the vapor chamber for first light, a thermoelectric conversion device for first light that transfers heat to and from the vapor chamber for first light, and a heat sink for first light that cooperates with the vapor chamber for first light to sandwich the thermoelectric conversion device for first light and transfers heat to and from the thermoelectric conversion device for first light, and the first actuator and the second actuator are each disposed at a position separate from a side end facing the optical path shifting module out of side ends of the thermoelectric conversion device for first light, a panel temperature sensor that detects a temperature of the liquid crystal panels for first light, and a shift control section that controls the optical path shifting module, wherein when the temperature of the liquid crystal panel for first light detected by the panel temperature sensor is lower than a threshold, the shift control section switches shift control from first shift control in which a position of each pixel contained in the projection image light output from the light combiner is sequentially shifted from a first position to a plurality of shift positions to second shift control in which the position of the pixel is sequentially shifted to the first position and one of the plurality of shift positions.

2. The projector according to claim 1, wherein the third panel module includes a liquid crystal panel for third light that outputs the third image light, a vapor chamber for third light that extends from the liquid crystal panel for third light along the third axis, transfers heat to and from the liquid crystal panel for third light, and diffuses the received heat in the vapor chamber for third light, a thermoelectric conversion device for third light that transfers heat to and from the vapor chamber for third light, and a heat sink for third light that cooperates with the vapor chamber for third light to sandwich the thermoelectric conversion device for third light and transfers heat to and from the thermoelectric conversion device for third light, and the first actuator and the second actuator are each disposed at a position separate from a side end facing the optical path shifting module out of the side ends of the thermoelectric conversion device for third light.

3. The projector according to claim 1, wherein the first actuator is disposed on the second swing axis.

4. The projector according to claim 3, wherein the first actuator and the second actuator are each disposed on an opposite side of the first swing axis from a side toward which the vapor chamber for first light extends.

5. The projector according to claim 3, wherein the first actuator is formed of a pair of the first magnet and the first coil that sandwich the first swing axis and are located on the second swing axis, the second actuator is formed of a pair of the second magnet and the second coil that sandwich the second swing axis and are located at positions separate from the first swing axis, and at least one of the pair of the first magnet and the first coil and the pair of the second magnet and the second coil are disposed at an opposite side of the first swing axis from a side toward which the vapor chamber for first light extends.

6. The projector according to claim 1, wherein the optical path shifting module includes a first movable section that holds the optical path changing member, a second movable section that holds the first movable section so as to be swingable around the first swing axis, and a base that holds the second movable section so as to be swingable around the second swing axis, the first actuator is disposed on the second swing axis and between the first movable section and the second movable section when viewed from a light exiting side of the optical path shifting module, and swings the first movable section around the first swing axis, and the second actuator is disposed between the second movable section and the base on an opposite side of the first swing axis from a side toward which the vapor chamber for first light extends when viewed from a light exiting side of the optical path shifting module, and swings the second movable section around the second swing axis.

7. The projector according to claim 1, wherein the optical path shifting module includes a first movable section that holds the optical path changing member, a second movable section that holds the first movable section so as to be swingable around the first swing axis, and a base that holds the second movable section so as to be swingable around the second swing axis, the first actuator is disposed on the second swing axis and between the first movable section and the second movable section when viewed from a light exiting side of the optical path shifting module, and swings the first movable section around the first swing axis, and the second actuator is disposed on the first swing axis and between the second movable section and the base, and swings the second movable section around the second swing axis.

8. The projector according to claim 1, further comprising:

a panel control section that controls the liquid crystal panel for first light, wherein when the temperature of the liquid crystal panel for first light detected by the panel temperature sensor is lower than the threshold, the panel control section switches panel control from first panel control in which the first image light to be projected at the first position and a plurality of ones of the first image light to be projected at the plurality of shift positions are sequentially formed at a first refresh rate to second panel control in which the first image light to be projected at the first position and the first image light to be projected at one of the plurality of shift positions are sequentially formed at a second refresh rate lower than the first refresh rate.

9. The projector according to claim 8, wherein the plurality of shift positions include a second position set at a location shifted from the first position in a first direction, a third position set at a location shifted from the second position in a second direction perpendicular to the first direction, and a fourth position set at a location shifted from the first position in the second direction, the panel control section sequentially forms, in the first panel control, the first image light to be projected at the first position, the first image light to be projected at the second position, the first image light to be projected at the third position, and the first image light to be projected at the fourth position at the first refresh rate, and sequentially forms, in the second panel control, the first image light to be projected at the first position and the first image light to be projected at the third position at the second refresh rate, the second refresh rate is half the first refresh rate, and in the second shift control, the shift control section shifts the projection image light to the first position at a timing when the first image light to be projected at the first position is formed, and shifts the projection image light to the third position at a timing when the first image light to be projected at the third position is formed.

10. The projector according to claim 8, wherein the second panel module includes a liquid crystal panel for second light that outputs the second image light, the third panel module includes a liquid crystal panel for third light that outputs the third image light, the panel temperature sensor includes a first panel sensor that detects the temperature of the liquid crystal panels for first light, a second panel sensor that detects a temperature of the liquid crystal panels for second light, and a third panel sensor that detects a temperature of the liquid crystal panels for third light, and when the temperature of at least one of the liquid crystal panel for first light, the liquid crystal panel for second light, and the liquid crystal panel for third light is lower than the threshold, the shift control section operates the optical path shifting module under the second shift control, and the panel control section operates the liquid crystal panel for first light, the liquid crystal panel for second light, and the liquid crystal panel for third light under the second panel control.

11. The projector according to claim 1, further comprising:

an actuator temperature sensor that detects a temperature of the first actuator and a temperature of the second actuator; and a thermoelectric conversion device control section that controls the thermoelectric conversion device for first light, wherein when the temperature of at least one of the first actuator and the second actuator detected by the actuator temperature sensor is higher than a predetermined value, the thermoelectric conversion device control section reduces an output of the thermoelectric conversion device for first light.

12. A projector comprising:

a first panel module that has a first axis as an optical axis and outputs first image light that is modulated first light;

a second panel module that has a second axis perpendicular to the first axis as an optical axis and outputs second image light that is modulated second light;

a third panel module that has the first axis as an optical axis and outputs third image light that is modulated third light;

a light combiner having a first light incident surface on which the first image light is incident, a second light incident surface on which the second image light is incident, a third light incident surface on which the third image light is incident, and a light exiting surface which has the second axis as an optical axis and via which projection image light exits, the projection image light being a combination of the first image light, the second image light, and the third image light;

a projection optics module that projects the projection image light output from the light combiner; and an optical path shifting module that shifts an optical path of the projection image light that is output from the light combiner and enters the projection optics module, wherein the optical path shifting module includes an optical path changing member disposed in the optical path between the light combiner and the projection optics module, a first actuator that includes a first magnet and a first coil and swings the optical path changing member around a first swing axis along the first axis, and a second actuator that includes a second magnet and a second coil and swings the optical path changing member around a second swing axis along a third axis perpendicular to each of the first axis and the second axis, the first panel module includes a liquid crystal panel for first light that outputs the first image light, a vapor chamber for first light that extends from the liquid crystal panel for first light along the third axis, transfers heat to and from the liquid crystal panel for first light, and diffuses the received heat in the vapor chamber for first light, a thermoelectric conversion device for first light that transfers heat to and from the vapor chamber for first light, and a heat sink for first light that cooperates with the vapor chamber for first light to sandwich the thermoelectric conversion device for first light and transfers heat to and from the thermoelectric conversion device for first light, and the first actuator and the second actuator are each disposed at a position separate from a side end facing the optical path shifting module out of side ends of the thermoelectric conversion device for first light, an actuator temperature sensor that detects a temperature of the first actuator and a temperature of the second actuator; and a thermoelectric conversion device control section that controls the thermoelectric conversion device for first light, wherein when the temperature of at least one of the first actuator and the second actuator detected by the actuator temperature sensor is higher than a predetermined value, the thermoelectric conversion device control section reduces an output of the thermoelectric conversion device for first light.

13. The projector according to claim 12, wherein the third panel module includes a liquid crystal panel for third light that outputs the third image light, a vapor chamber for third light that extends from the liquid crystal panel for third light along the third axis, transfers heat to and from the liquid crystal panel for third light, and diffuses the received heat in the vapor chamber for third light, a thermoelectric conversion device for third light that transfers heat to and from the vapor chamber for third light, and a heat sink for third light that cooperates with the vapor chamber for third light to sandwich the thermoelectric conversion device for third light and transfers heat to and from the thermoelectric conversion device for third light, and the first actuator and the second actuator are each disposed at a position separate from a side end facing the optical path shifting module out of the side ends of the thermoelectric conversion device for third light.

14. The projector according to claim 12, wherein the first actuator is disposed on the second swing axis.

15. The projector according to claim 14, wherein the first actuator and the second actuator are each disposed on an opposite side of the first swing axis from a side toward which the vapor chamber for first light extends.

16. The projector according to claim 14, wherein the first actuator is formed of a pair of the first magnet and the first coil that sandwich the first swing axis and are located on the second swing axis, the second actuator is formed of a pair of the second magnet and the second coil that sandwich the second swing axis and are located at positions separate from the first swing axis, and at least one of the pair of the first magnet and the first coil and the pair of the second magnet and the second coil are disposed at an opposite side of the first swing axis from a side toward which the vapor chamber for first light extends.

17. The projector according to claim 12, wherein the optical path shifting module includes a first movable section that holds the optical path changing member, a second movable section that holds the first movable section so as to be swingable around the first swing axis, and a base that holds the second movable section so as to be swingable around the second swing axis, the first actuator is disposed on the second swing axis and between the first movable section and the second movable section when viewed from a light exiting side of the optical path shifting module, and swings the first movable section around the first swing axis, and the second actuator is disposed between the second movable section and the base on an opposite side of the first swing axis from a side toward which the vapor chamber for first light extends when viewed from a light exiting side of the optical path shifting module, and swings the second movable section around the second swing axis.

18. The projector according to claim 12, wherein the optical path shifting module includes a first movable section that holds the optical path changing member, a second movable section that holds the first movable section so as to be swingable around the first swing axis, and a base that holds the second movable section so as to be swingable around the second swing axis, the first actuator is disposed on the second swing axis and between the first movable section and the second movable section when viewed from a light exiting side of the optical path shifting module, and swings the first movable section around the first swing axis, and the second actuator is disposed on the first swing axis and between the second movable section and the base, and swings the second movable section around the second swing axis.

* * * * *